United States Patent
Shaposhnik

(10) Patent No.: US 8,843,926 B2
(45) Date of Patent: Sep. 23, 2014

(54) GUEST OPERATING SYSTEM USING VIRTUALIZED NETWORK COMMUNICATION

(75) Inventor: Yona Shaposhnik, Oak Park, MI (US)

(73) Assignee: Pristine Machine, West Bloomfield, MI (US)

( * ) Notice: Subject to any disclaimer, the term of this patent is extended or adjusted under 35 U.S.C. 154(b) by 0 days.

(21) Appl. No.: 13/493,882

(22) Filed: Jun. 11, 2012

(65) Prior Publication Data

US 2013/0332924 A1   Dec. 12, 2013

Related U.S. Application Data

(63) Continuation of application No. 13/493,702, filed on Jun. 11, 2012.

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | | |
|---|---|---|---|---|
| 6,122,741 | A * | 9/2000 | Patterson et al. | 726/17 |
| 8,166,474 | B1 * | 4/2012 | Delco et al. | 718/1 |
| 8,301,874 | B1 * | 10/2012 | Heidingsfeld et al. | 713/2 |
| 2008/0028400 | A1 * | 1/2008 | Taillefer et al. | 718/1 |
| 2009/0125902 | A1 * | 5/2009 | Ghosh et al. | 718/1 |
| 2010/0070725 | A1 * | 3/2010 | Prahlad et al. | 711/162 |
| 2010/0169881 | A1 * | 7/2010 | Silvera et al. | 718/1 |
| 2011/0239268 | A1 * | 9/2011 | Sharp et al. | 726/1 |
| 2012/0151481 | A1 * | 6/2012 | Kang et al. | 718/1 |

OTHER PUBLICATIONS

Lucid Tips, "Secure browsing using VMWare Browser Appliance," Mar. 29, 2008 [retrieved on Jun. 5, 2012]. Retrieved from the Internet: http://www.lucidtips.com/2008/03/29/secure-browsing-using-vmware-browser-appliance/.
SpywareInfo, "Surf the Web in Complete Safety by Mike Healan," Jan. 25, 2006 [retrieved on Jun. 5, 2012]. Retrieved from the Internet: http://web.archive.org/web/20060205025212/http://www.spywareinfo.com/articles/vmware/baintro.php.
Vmware, "Solution Exchange," 2011 [retrieved on Jun. 5, 2012]. Retrieved from the Internet: http://solutionexchange.vmware.com/store/category_groups/19.
Vmware, Virtual Appliances, 2012 [retrieved on Jun. 5, 2012]. Retrieved from the Internet: http://www.vmware.com/appliances/directory/node/507083.
Wikipedia, "VMware Player," Jun. 1, 2012 [retrieved on Jun. 5, 2012]. Retrieved from the Internet: http://en.wikipedia.org/wiki/VMware_Player#Resources.
Yagel, Reuven, "Self-Stabilizing Operating Systems," Submitted to the Senate of Ben-Gurion University of the Negev, Sep. 2007.

* cited by examiner

*Primary Examiner* — Gregory A Kessler
(74) *Attorney, Agent, or Firm* — Avery Goldstein; Blue Filament Law

(57) ABSTRACT

Among other things, a guest operating system is refreshed from a master image of the guest operating system repeatedly in connection with use of one or more electronic devices on which the guest operating system is hosted. A guest operating system is executed on a virtual machine, and, from time to time, while the virtual machine is running, the guest operating system is reloaded from a master image of the guest operating system.

17 Claims, 6 Drawing Sheets

GUEST OPERATING SYSTEM USING VIRTUALIZED NETWORK COMMUNICATION

RELATED APPLICATION

This application is a continuation (and claims the benefit of priority under 35 U.S.C. 120) of U.S. application Ser. No. 13/493,702 filed Jun. 11, 2012, the contents of which are incorporated herein in their entirety by reference.

BACKGROUND

An operating system is a fundamental component of some computer systems. Among other things, an operating system manages interactions between a computer system's hardware and software programs that operate on the computer system. The operating system can also provide a user interface that a user (e.g., a human operator) uses to interact with the computer system and software applications. An operating system executed by and interacting with a particular computer system can be said to be "running on" or "running within" the particular computer system. The computer system that an operating system runs on need not be a physical computer system. An operating system can also run on a software simulation of a computer system, sometimes called a virtual machine. Sometimes, a first operating system running on physical computer hardware executes a virtual machine, and a second operating system runs on the virtual machine. The first type of operating system can be called a "host operating system" and the second type of operating system is an example of a "guest operating system."

An operating system is prone to failures. A failure may be a temporary failure. For example, a software program running on the operating system may execute an instruction in a manner unexpected by the operating system, causing an error condition in the operating system. This may manifest itself as an "operating system crash" and require rebooting of the operating system, or in more severe situations the operating system to be erased from memory, entered back into memory, and re-executed.

A failure may be an ongoing failure. For example, a software program may modify the operating system causing the operating system to behave differently than as designed. The modification could be unintentional, e.g., a software program causes a change in the operating system that has unintended consequences. The modification may be intentional, e.g., a malicious software program such as a virus causes a harmful modification to the operating system.

An operating system may be changed (sometimes often) over a period of time by updates and upgrades that are provided by the manufacturer or other source and that modify the code of the operating system. These updates and upgrades are often made in response to changes in hardware of the computer system that the operating system may run on, or to make the operating system more resistant to malicious software that targets the operation of the operating system, or to provide additional features, or to achieve combinations of those objectives. Many of the features provided by an operating system to application software and to the user make use of hardware facilities of the computer system on which the operating system runs.

SUMMARY

The use of computer operating systems that we describe here may encompass one or more of the following (and other) aspects, features, and implementations, and combinations of them.

In general, in one aspect, a computer system includes one or more computer devices including a first computer device, wherein the first computer device comprises a first network communication device, a host operating system executing on the first computer device, wherein the host operating system is configured to directly operate the network communication device, a virtualized network communication device, whereby use of the virtualized network communication device results in direct operation of the first network communication device by the host operating system, a guest operating system, wherein the guest operating system is configured to use the virtualized network communication device for network communication activities, a first nonvolatile data storage device storing a master image of the guest operating system, and a second nonvolatile data storage device which stores user information generated by the guest operating system, wherein, in response to an instruction generated by the host operating system, the computer system is configured to automatically refresh the guest operating system from the master image stored in the first nonvolatile data storage device and the user information stored in the second nonvolatile data storage device.

Implementations may include one or more of the following features. The system includes a virtual machine which includes the virtualized network communication device and the virtualized data storage device, wherein the guest operating system executes within the virtual machine. The virtual machine executes within the host operating system. The system includes a first display device configured to display images, a first input device for manual or verbal instructions from a user, a virtualized display device, whereby use of the virtualized display device results in operation of the first display device by the host operating system, and a virtualized input device, whereby input received by the host operating system via the first input device is provided to an operating system using the virtualized input device, wherein the guest operating system is configured to use the virtualized display device to display a user interface and is configured to use the virtualized input device to provide input for operating the user interface. The host operating system does not provide a user interface for use via the first display device. The first computer device further includes a first data storage device, the host operating system is configured to directly operate the first data storage unit, the system further includes a virtualized data storage device, whereby use of the virtualized data storage device results in direct operation of the first data storage device by the host operating system, and the guest operating system is configured to use the virtualized data storage device for data storage activities. The system includes a third nonvolatile data storage device which stores data for installation of a first application program on the guest operating system, wherein, in response to the instruction from the host operating system, the computer system is configured to install the first application program on the guest operating system from the third nonvolatile data storage device. The system includes a fourth nonvolatile data storage device which stores data for installation of a second application program on the guest operating system, wherein the host operating system is configured to identify and record a problem associated with the second application, and wherein, in response to the instruction from the host operating system, the computer system is configured to install the second application program on the guest operating system from the fourth nonvolatile data storage device, unless the host operating system has recorded a problem associated with the second application. The host operating system is configured to generate the instruction in response to identifying a problem associated with the second application. The system is configured to monitor operation of the guest operating system, and the host operating system is configured to generate the instruction in response to the monitoring of the guest operating system. The host operating system is configured to generate the instruction in response to a detected misoperation or failure of the guest operating system. The host operating system is configured to generate the instruction in response to a detection of unauthorized access of the guest operating system. The host operating system in configured to periodically generate the instruction. The master image is unchanged from refreshing to refreshing of the guest operating system. The host operating system is configured to required encrypted communication via the first network communication device in response to use of the virtualized network communication device by the guest operating system. The host operating system is configured to perform monitoring and control of network communications requested by the guest operating system. The host operating system is configured to perform automatic maintenance of device drivers without requiring user interaction and without requiring termination of the guest operating system.

In general, in another aspect, a system includes a computer system including a network communication device, a host operating system executing on the computer system, the host operating system being configured to directly operate the network communication device, a virtualized network communication device, wherein use of the virtualized network communication device results in direct operation of the network communication device by the host operating system, a guest operating system executing on the computer system, the guest operating system being configured to use the virtualized network communication device for network communication activities, a first nonvolatile data storage device storing a master image of the guest operating system, and a second nonvolatile data storage device storing user information generated by the guest operating system, wherein, in response to an instruction generated by the host operating system, the computer system is configured to automatically refresh the guest operating system from the master image stored in the first nonvolatile data storage device and the user information stored in the second nonvolatile data storage device.

Implementations may include one or more of the following features. The system includes a virtual machine which includes the virtualized network communication device, the guest operating system executing within the virtual machine. The virtual machine executes within the host operating system. The system includes a display device configured to display images, an input device configured to receive instructions from a user, a virtualized display device, wherein use of the virtualized display device results in operation of the display device by the host operating system, and a virtualized input device, wherein input received by the host operating system via the input device is provided to an operating system using the virtualized input device, the guest operating system being configured to use the virtualized display device to display a user interface and configured to use the virtualized input device to provide input for operating the user interface. The host operating system does not provide a user interface at the display device. The system includes a virtualized data storage device, wherein use of the virtualized data storage device results in direct operation of the second nonvolatile data storage device by the host operating system, and the guest operating system being configured to use the virtualized data storage device for data storage activities. The response to an instruction from the host operating system, the computer system is configured to install an application program on the guest operating system. The host operating system is configured to identify and record a problem associated with the application program, and in response to the instruction from the host operating system, the computer system is configured to install the application program on the guest operating system unless the host operating system has recorded a problem associated with the application program. The host operating system is configured to generate the instruction in response to identifying a problem associated with the application program. The computer system is configured to monitor operation of the guest operating system, and the host operating system is configured to generate the instruction in connection with the monitoring of the guest operating system. The host operating system is configured to generate the instruction in response to a detected condition of the guest operating system. The host operating system is configured to generate the instruction in response to a detection of unauthorized access of the guest operating system. The host operating system in configured to periodically generate the instruction. The master image is unchanged from refreshing to refreshing of the guest operating system. The host operating system is configured to encrypt communication made using the network communication device in response to use of the virtualized network communication device by the guest operating system. The host operating system is configured to perform monitoring and control of network communications requested by the guest operating system. The host operating system is configured to perform automatic maintenance of device drivers without requiring user interaction and without requiring termination of the guest operating system. The host operating includes a kernel abstraction layer which isolates the virtual machine from the first computer device.

In general, in another aspect, a method of configuring one or more computer devices including a first computer device, the first computer device comprising a first network communication device, includes executing a host operating system on the first computer device, wherein the host operating system is configured to directly operate the network communication device, executing a guest operating system on one of the one or more computer devices, wherein the guest operating system is configured to use a virtualized network communication device for network communication activities, whereby use of the virtualized network communication device results in direct operation of the first network communication device by the host operating system, and refreshing the guest operating system, in response to an instruction generated by the host operating system, from a master image of the guest operating system stored in a first nonvolatile data storage device and user information stored in a second nonvolatile data storage device.

Implementations may include one or more of the following features. The method includes executing a virtual machine which provides the virtualized network communication device, wherein the executing of the guest operating system is within the virtual machine. The executing of the virtual machine is within the host operating system. The method includes providing a kernel abstraction layer in the host operating system to isolate the virtual machine from the first computer device. The host operating stores one or more passwords for use with user applications executing on the guest operating system.

In general, in another aspect, a method includes refreshing a guest operating system from a master image of the guest operating system repeatedly in connection with use of one or more electronic devices on which the guest operating system is hosted.

Implementations may include one or more of the following features. A portion of the guest operating system is refreshed from the master image and a portion of the guest operating system is not refreshed from the master image. The refreshing occurs in response to an event associated with use of the one or more electronic devices. The refreshing occurs at prearranged times or at regular intervals. The refreshing occurs in response to a characteristic of an operation of the guest operating system. The characteristic includes incorrect operation of the guest operating system. The refreshing occurs upon failure of the guest operating system. The refreshing occurs upon a moving of the master image of the guest operating system from one to another of the electronic devices. The guest operating system is hosted on a virtual machine exposed by a host operating system on at least one of the electronic devices. The guest operating system is refreshed from a master image on a portable storage device. The method also includes refreshing a host operating system running on one or more of the electronic devices. The electronic devices include one or more of a desktop computer, a laptop computer, a mobile computing device, a mobile phone, or a tablet computer. The master image is unchanged from refreshing to refreshing.

In general, in another aspect, a method includes executing a guest operating system on a virtual machine, from time to time, while the virtual machine is running, reloading the guest operating system from a master image of the guest operating system.

Implementations may include one or more of the following features. The virtual machine is hosted by a host operating system. At least some services available directly to the host operating system are not directly accessible to the guest operating system. Some services that are available directly to the host operating system are not directly accessible to the guest operating system, and at least some services available directly to the host operating system are directly accessible to the guest operating system. The host operating system reduces access by the guest operating system to services of an electronic device on which the host operating system is running, based on a condition of the electronic device. The services of the electronic device include a network interface. The host operating system hides from a user, user interface elements that would otherwise be exposed to the user by the host operating system. Reloading the guest operating system from a master image includes installing a user application on the guest operating system from a secondary master image. Detecting a condition of the user application and, based on the condition, deleting the secondary master image. The condition includes a failure condition or a security condition. The method includes detecting a condition of the guest operating system and, based on the condition, refreshing the guest operating system. The condition includes a failure condition or a security condition. The method includes disabling a user interface of the virtual machine. The guest operating system is reloaded into random access memory. The master image is stored in firmware. The method includes executing the guest operating system after reloading it from the master image. The method includes terminating the guest operating system before reloading it from the master image. From time to time includes on a regular schedule.

In general, in another aspect, an apparatus includes a storage device containing a host operating system and a guest operating system, the host operating system including features to interface with services available on an electronic device, the guest operating system including features that are exposed to a user to enable a user to make use of the services available on the computer system through the host operating system but without enabling the user to access the services available on the computer system directly through the host operating system.

Implementations may also include one or more of the following features. Hardware of the computer system is not accessible to the guest operating system. The apparatus includes a secondary re-writeable storage device accessible by the guest operating system. The secondary re-writeable storage device stores secondary data storage images including software executable to install an application program executable under the guest operating system. The apparatus includes a data storage image containing the host operating system and the guest operating system. The storage device includes a read-only storage device to copy the data storage image to random access memory of the electronic device prior to execution of the host operating system. The storage device includes a read-only storage device.

In general, in another aspect, a storage device contains a host operating system that causes execution under the host operating system of any one of two or more guest operating systems chosen independently of the services available on an electronic device on which the host operating system is executed, the host operating system having features to interface with services available on the electronic device.

Implementations may include one or more of the following features. The guest operating system is configured to operate on hardware other than hardware of the electronic device. The hardware of the electronic device is not accessible to the guest operating system. The storage device includes a read-only storage device and includes a secondary re-writeable storage device accessible to the guest operating system.

In general, in another aspect, a method includes a user accessing features made available by a host operating system running on an electronic device, the user accessing the features indirectly through a guest operating system running on a virtual machine exposed by the host operating system, the guest operating system being provided from a master image stored in a data storage device inaccessible to the guest operating system.

In general, in another aspect, a method includes a guest operating system enabling a user to interact with an electronic device, the guest operating system effecting interactions of the user by invoking features of a virtual machine that is exposed by a host operating system running on the electronic device, the guest operating system being provided from a master image.

In general, in another aspect, an integrated circuit package comprises embedded components capable of running a general purpose operating system, and a read-only storage device containing a host operating system and a guest operating system, the host operating system comprising features to interface with services made available by the embedded components, the guest operating system comprising features that are exposed to a user to enable a user to make use of the services made available by the embedded components through the host operating system but without enabling the user to access the services made available by the embedded components directly through the host operating system.

Implementations may include one or more of the following features. The embedded components are not accessible to the guest operating system. The guest operating system is configured to access a secondary re-writeable storage device external to the integrated circuit package. The read-only storage device comprises a data storage image containing the host operating system and the guest operating system. At least some of the embedded components are configured to copy the data storage image to random access memory prior to execution of the host operating system.

These and other aspects, features, and implementations, and combinations of them, may be expressed as apparatus, methods, methods of doing business, means or steps for performing functions, components, systems, program products, and in other ways.

Advantages may include one or more of the following. A bifurcated operating system is effective in managing hardware and software resource in a secure environment and is robust against external attacks. Other benefits, such as robust and transparent mechanisms for ensuring delivery and application of hardware driver updates, are also obtained via the described techniques.

Other aspects, features, and advantages will be apparent from the description and the claims.

DESCRIPTION

Figure 1:
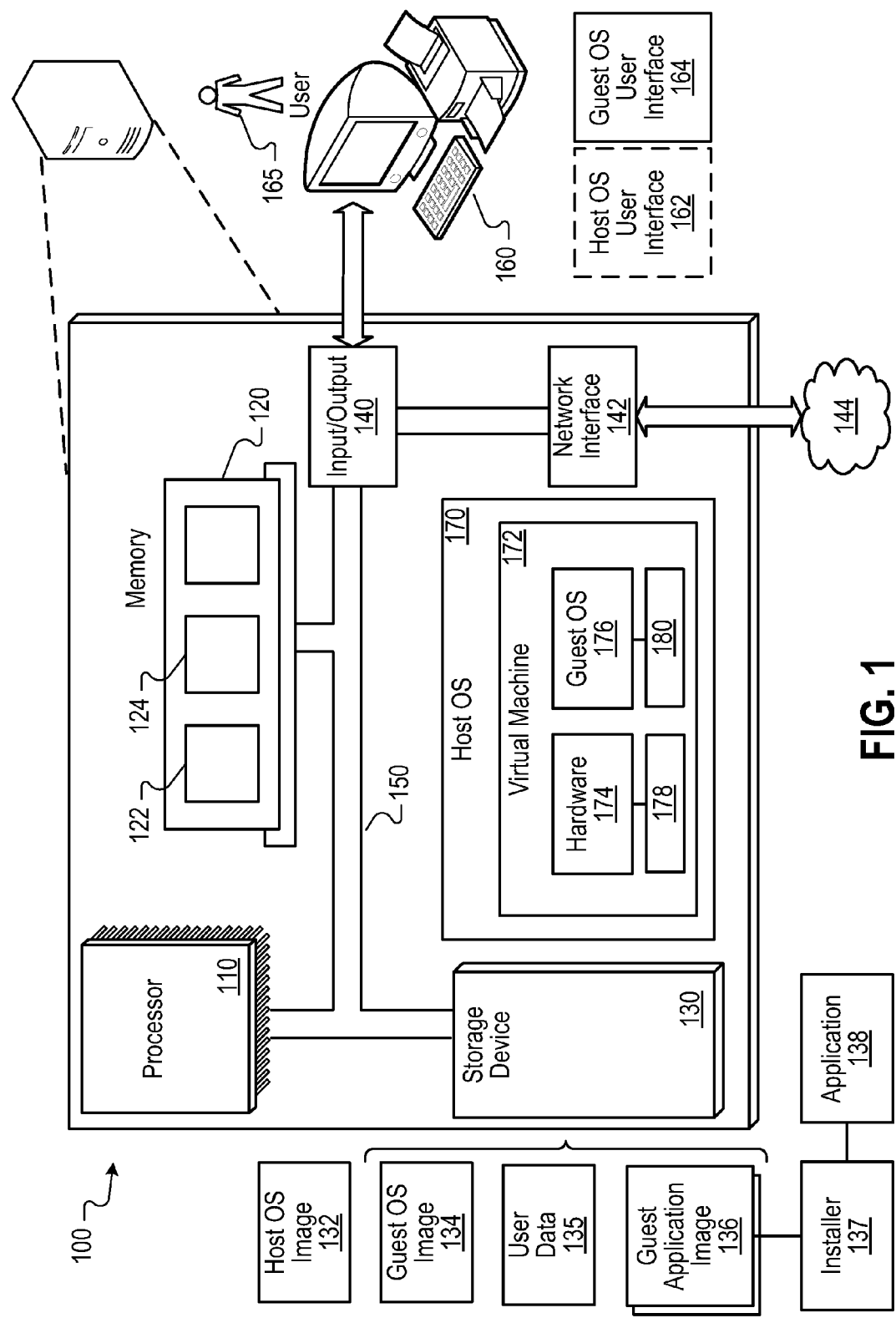
FIG. 1 is block diagram illustrating a computer processing system that incorporates both a host operating system and a guest operating system to provide a Secure Operating System.

In some examples of what we describe here, a secure computer system that would not require user-initiated system software maintenance (patching, defragmentation, virus removal, etc.) could be created of commonly available components (open source software, common user operating system such as Windows or Macintosh, personal computer, common hardware peripherals). This computer system could be transferred to single computer processing circuit (System on Chip or SOC) and used with various user output/display devices. Such devices could be miniaturized using miniaturization technology (such as nano technology), combined and embedded for specialized uses.

Some instances of the techniques discussed below combine host and guest operating systems, in some examples via virtualization software, to achieve greater functionality, security, lower maintenance/production costs. In many cases, the resultant total functionality cannot be accomplished with either the host or guest operating systems separately. In some implementations, such functionalities would be unique and specifically useful for, not excluding others, military, police, intelligence, bank firm, financial security, exchange, medical, transportation, geological type firms as will be described by use cases below.

A guest operating system can be run within a virtual machine running on a host operating system which in turns runs on hardware of a physical computer system. If the guest operating system serves as the medium of interaction with a user of the computer system, then the hardware of the computer system and the host operating system can be partly or entirely isolated from the activities of the user.

If a guest operating system is exposed to a condition that could cause an ongoing failure, the guest operating system can be refreshed, for example, by a host operating system by reloading and re-executing all or part of the operating system. If all or part of the guest operating system is reloaded (e.g., reloaded into memory from which the guest operating system is executed) from an unchanging master image, then any modification causing an ongoing failure can be eliminated and therefore need not be permanent.

In some examples, if an operating system runs as a guest within a virtual machine, the guest operating system may interact only with simulated hardware maintained and exposed by the virtual machine to the guest operating system and not interact directly with physical hardware of the computer system. In addition, the software making up a guest operating system that runs on a virtual machine can be stored in a read-only form, which resists modification that could cause ongoing failures. If any modification to the guest operating system occurs as it is running, then the modification made to the guest operating system can be disposed of by reloading the operating system from the read-only storage image.

Also, if the guest operating system running within a virtual machine interacts with simulated hardware of the virtual machine and not physical hardware of the computer system, the guest operating system can be used on a computer system other than a computer system for which the guest operating system was designed, because the virtual machine on each of the computer systems can provide the simulated hardware interface expected by the guest operating system regardless of differences in the physical hardware of the computer systems. Each computer system need only support a host operating system and a virtual machine that provides the expected virtual hardware interface and on which the guest operating system runs. Thus, the guest operating system could run on a greater variety of computer hardware than originally designed.

Features of the host operating system may include, for example:

1) hardware bootstrap and hardware management (CPU) capabilities;

2) capability to host peripheral device drivers (network, storage, video, etc.);

3) optional ability to update drivers via secure pull method;

4) ability to restrict user access to itself;

5) ability to function invisible to output devices (however, a lower level network pack scanning could detect presence of the host operating system unless guest hardware is fully abstracted);

6) ability to block interrupt key combination to prevent user from interrupting from a guest operating system;

7) optional ability to host local firewall and IP route tables, and perform SSL tunneling to provide a software security tunnel;

8) ability to schedule work-load;

9) ability to perform monitoring resources and processes;

10) ability to run virtualization software;

11) ability to run utility applications;

12) ability to restart the guest operating system;

13) ability to provide and/or share storage with the guest operating system;

14) optional ability to run host operating system in memory;

15) ability to add/remove routines to a guest operating system start-up sequence;

16) host an image for the guest operating system;

17) ability to isolate memory/process space from the guest operating system;

18) TCP/DHCP client;

19) support for NTP client/server;

20) ability to disable not-required services; and 21) plug-n-play hardware detection.

Features of the guest operating system may include, for example:

1) provide user interface services;
2) maintain and record user run-time state;
3) reconstruct a desired user state;
4) secure web browser/e-mail/word processor;
5) ability to install application and configuration by way of a single command without reboot of the guest operating system;
6) services that need not be modified by the user should be restricted from modification;
7) ability to run basic virus prevention software and local firewall software;
8) plug-n-play hardware detection (although this may be applied to virtualized devices, rather than directly for actual hardware);
9) network protocol support;
10) ability to mount remote network storage;
11) relatively small memory requirement for regular minimal load (ensuring that guest OS memory+guest OS virtual memory+host OS memory<physical memory available to computer system);
11) ability to obfuscate system information so it would not be visible to user and spy software;
12) segregated system configuration definitions so essential user state can be preserved after refresh of guest operating system from image; and
13) ability to disable shut-down for overall system and specific services.

FIG. 1 is a block diagram of an example computer system 100. The computer system 100 includes a processor 110, a memory 120, a storage device 130, and input/output devices 140. The components can be interconnected, for example, using a system bus 150. The processor 110 is capable of processing instructions for execution within the computer system 100. In some implementations, the processor 110 is a single-threaded processor. In some implementations, the processor 110 is a multi-threaded processor. In some implementations, the processor 110 is a quantum computer. The processor 110 is capable of processing instructions stored in the memory 120 or instructions that can be moved into memory 120 from the storage device 130. In some implementations, instructions may be executed by the processor 110 directly from a storage device 130. The memory 120 stores information within the computer system 100. In some implementations, the memory 120 is a computer-readable medium. In some implementations, the memory 120 is a volatile memory unit. In some implementations, the memory 120 is a non-volatile memory unit. In some implementations, the memory can be a combination of any two or more kinds of memory. In some examples, the memory 120 includes discrete units that are each accessible by an address. For example, the memory 120 may be divided into units such as bytes or words each of which can be read from and written to by sending a command to read or write that includes the address corresponding to the unit or units.

The storage device 130 is capable of providing mass storage for the system 100. In some implementations, the storage device 130 is a computer-readable medium. In various different implementations, the storage device 130 can include, for example, a hard disk device, an optical disk device, a solid-date drive, a flash drive, magnetic tape, a "USB keychain" drive, or some other storage device, or any combination of any two or more of those. In some implementations, the computer system 100 has multiple storage devices 130, for example, a hard disk device and a flash drive.

The input/output devices 140 provide input/output operations for the computer system 100. In some implementations, the input/output devices 140 can include driver devices configured to receive input data and send output data to other input/output peripherals 160, e.g., keyboard, printer and display devices. In some examples, the input/output peripherals 160 are external devices (e.g., separate physical devices from the computer system 100), and in some examples, the input/output peripherals 160 are integrated with the computer system 100 (e.g., electronics packages that are part of the computer system 100). In some implementations, mobile computing devices, mobile communication devices, and other devices can be used. For example, the computer system 100 could be a mobile device such as a laptop computer, a tablet computer, a personal digital assistant, a mobile phone such as a smart phone, or another kind of mobile device. In some implementations, the input/output devices 140 can include one or a combination of any two or more of a network communication device 142, e.g., an Ethernet card, a serial communication device, e.g., an RS-232 port, and/or a wireless interface device, e.g., an 802.11 card, a 3G wireless modem, or a 4G wireless modem. A network communication device 142 allows the computer system 100 to communicate, for example, transmit and receive data over a network 144. For example, the network 144 could be a local area network (LAN), a world-wide network such as the Internet, or another kind of network for data communication.

The processor 110 is capable of executing programs, which are collections of instructions that cause the processor 110 to perform actions. For example, the processor 110 may execute the instructions of an operating system, such as host operating system 170. We use the term operating system to refer broadly to any kind, size, or configuration of operating system including, for example, a program or a collection of programs that interact with resources of a computer system, for example, the processor 110, memory 120, storage device 130, and input/output devices 140, manage the use of those resources by other programs, and provide features that are useful to the other programs and to the user of the computer system. When a program's use of the resources of the computer system 100 is managed by an operating system, the program can be said to be "running on" the operating system. In some examples, the operating system 170 begins to be executed when the computer system 100 is activated (for example, is booted up) and remains active while the computer system 100 remains active. An operating system can take any of several forms and any kind of operating system could be used in the techniques described here.

In some implementations, one of the programs that runs on the host operating system 170 can be a virtual machine 172. In some examples, a virtual machine 172 is a software simulation of a computer system. Among other things, a virtual machine 172 simulates virtual hardware corresponding to hardware of a physical computer system. For example, the virtual machine 172 may simulate a processor, for example, like the processor 110 of the computer system 100. The virtual machine 172 may also simulate other types of resources of a computer system, for example, memory and input devices, similar to the memory 120 and input/output devices 140 of the computer system 100. The virtual machine 172 can make simulated (e.g., virtualized) hardware 174 available to another operating system, a guest operating system 176. The operating system 176 interacts with the simulated hardware 174 in the same manner in which the operating system 176 might interact with hardware of a physical system, e.g., the computer system 100, were the guest operating system 176 operating as the sole operating system on the computer system 100.

The operating system 176 also can provide features that are useful to programs that run on the operating system 176, and also to the user. In this way, the operating system 176 can use services of the computer system 100 but does not access those services directly. Instead, the virtual machine 172 serves as an intermediary between the operating system 176 and the services. For example, when the operating system 176 accesses simulated hardware of the virtual machine, the operating system 176 is directly accessing services of the simulated hardware directly, but only using the underlying physical hardware indirectly. As one example of indirect access, the operating system 176 may access a hardware address of simulated hardware, which is translated into a different hardware address of physical hardware by the virtual machine 172. (In some implementations, techniques other than address translation are used.) In contrast, in direct access, the operating system 176 would directly operate a physical hardware device by accessing a hardware address assigned to the physical hardware. The virtual machine 172 may impose limitations on the use of the services of the computer system 100, for example, limitations that would not be present if the operating system 176 were to have direct access to the services of the computer system 100. These limitations can be designed to screen or protect the services and hardware from unintended or deliberate misuse by the programs that run on the virtual machine 172.

In some implementations, we refer to the operating system 170 running on the computer system 100 as a "host" operating system, and we refer to the operating system 176 running on the virtual machine 172 as a "guest" operating system. A guest operating system 176 running on a virtual machine 172 can be described as "hosted" by the virtual machine. In general, when a guest operating system 176 runs on a virtual machine 172, the guest operating system 176 does not need to be modified or configured to accommodate the host operating system 170 running the virtual machine 172; it only needs to be capable of running on the virtual machine. In this way, the guest operating system 176 can be said to be "unaware" of the host operating system 170.

The virtual machine 172 simulates hardware by establishing a correspondence between the simulated hardware 174 of the virtual machine 172 and physical hardware of the computer system 100 in which the virtual machine 172 runs. (In some implementations, a simulated hardware device is completely emulated and does not correspond to a physical hardware device.) For example, the virtual machine may simulate a processor by translating instructions executed within the guest operating system 176 for a simulated processor 178 into instructions executable by the processor 110 of the computer system 100. Put another way, the guest operating system 176 will be executed as though it were issuing instructions to a simulated processor 178 of the simulated hardware 174, but the virtual machine arranges for the instructions to be actually carried out by the physical processor 110 of the computer system 100. The guest operating system 176 may be designed to function by running on the simulated processor 178, and the virtual machine 172 allows and enables the guest operating system 176 to carry out operations using the physical processor 110. At the same time, the virtual machine 172 can shield the host operating system 170 and the physical hardware of the computer system from intrusion or damage and the guest operating system 176 on which the virtual machine 172 runs can be refreshed any time that becomes desirable or necessary.

In some examples, the virtual machine 172 allocates a portion 122 of the memory 120 for the guest operating system 176. The guest operating system 176 uses the portion 122 of memory allocated as though the allocated memory were all of and the only memory available to it on the simulated computer system represented by the virtual machine 172. For example, the virtual machine 172 may maintain simulated memory addresses used by the guest operating system 176 and translate the simulated memory addresses to actual memory addresses of the corresponding portion 122 of memory 120 allocated to the virtual machine 172. Another portion 124 of the memory 120 not allocated to the virtual machine 172 is not accessible by the guest operating system 176. Therefore, any program, including the guest operating system 176, that runs on the virtual machine 172 is not able to corrupt anything stored in the memory that is not allocated to the virtual machine 172.

The executable code making up the host operating system 170 and the guest operating system 176 can be stored on the storage device 130 and loaded into memory 120 and can be executed from memory during operation of the computer system 100. In some examples, the executable code that resides in the storage device 130 or in memory 120 can be derived from disk images 132, 134 of the operating systems. A disk image is, for example, a representation of a logical storage device that can be mounted and unmounted on the computer system 100 as if the disk image were a physical device such as the storage device 130. One example type of a disk image is called an ISO image. In some examples, a disk image can be rewriteable, and in some examples, a disk image can be read only. In some implementations, a disk image contains a program that installs other programs. In some implementations, a disk image can be a combination of two or more of those.

For example, the host operating system disk image 132 may contain a program that installs the executable code of the host operating system 170, for example, places the executable code of the host operating system 170 on the storage device 130 of the computer system 100. In some examples, the host operating system disk image 132 can be used to place executable code of the host operating system 170 directly in the memory 120 of the computer system 100 such that none of the executable code need be stored or accessed on the storage device 130. In some implementations, the disk image 132 contains a version of the host operating system 170 that is ready to be executed on the computer system 100, once loaded into memory 120, such that an installation program is not necessary.

In some implementations, storage device 130 may be provided by one or more discrete storage devices, and may also include network-based data storage, in which data is stored in a computer system separate from computer system 100. In some implementations, an image may be one or more files residing in one or more filesystems, or it may be an archive file, such as the well-known ZIP and TAR formats.

For example, we can refer to "installing" an operating system to include, for example, the act of copying a disk image into memory, for example copying the disk image 132 into memory 120. In some examples, the host operating system 170 can be installed on the computer system 100 once and remain on the storage device 130 for multiple successive uses, from memory 120, by the computer system 100, for example, multiple power-ups of the computer system 100. In some examples, the host operating system 170 is installed only for a single use of the computer system 100, and the host operating system 170 is re-installed from the host operating system disk image 132 each time the computer system 100 is powered on. In some implementations, the host operating system 170 can be re-installed from the host operating system disk image 132 to the storage device 130 and then into the memory 120. In some implementations, the host operating system disk image 132 can be copied directly into the memory 120.

We use the term "single use" to include, for example, a single installation of an operating system in response to a single instance of the computer system 100 powering on. Each time the computer system is powered on, or restarted (sometimes called rebooted), a single use of the computer system and a single installation of the operating system occurs. In some examples, the host operating system disk image 132 contains executable code of software applications that run on the host operating system 170, for example, executable code of the virtual machine 172. Because the same disk image 132 can be used multiple times, a disk image 132 that is reusable and does not change between installations or changes rarely is sometimes called a master image. In some examples, a master image is portable among different devices. For example, a master image used on one computer system 100 may be copied and used with another computer system. The same master image can be used on many different computer systems provided that the operating system can be run on each computer system.

A guest operating system disk image 134 may contain a program that installs the executable code of the guest operating system 176 for either a single use or multiple uses of the computer system 100. The guest operating system 176 can be installed from the disk image 134 on the virtual machine 172 such that the guest operating system 176 runs on the virtual machine 172. In some examples, the guest operating system disk image 134 can be used to place executable code of the guest operating system 176 in memory 120 of the computer system 100 such that none of the executable code need be stored or accessed on the storage device 130. For example, the executable code of the guest operating system 176 can be placed in a portion 122 of memory 120 designated by the virtual machine 172 as accessible to the guest operating system 176.

In some implementations, the disk image 134 contains a version of the guest operating system 176 that is ready to be executed on the computer system 100 such that an installation program is not necessary. In some examples, we can refer to "installing" the guest operating system 176 as the simple act of copying the disk image 134 into memory 120 without the running of an installation program. In some examples, the guest operating system 176 may be installed only for a single use of the computer system 100, such that the guest operating system 176 is re-installed from the guest operating system disk image 134 each time the computer system 100 is powered on. For example, the host operating system 170 can be configured to re-install the guest operating system 176 when the computer system 100 is powered on. In some implementations, the guest operating system 176 can be re-installed from the guest operating system disk image 134 to the storage device 130 and then into the memory 120. In some implementations, the guest operating system disk image 134 can be copied directly into the memory 120.

In some examples, the guest operating system 176 may also be installed multiple times during a single use of the computer system 100. For example, the guest operating system 176 may be re-installed every time the virtual machine 172 is terminated and re-activated, which may occur multiple times during a single use of the computer system 100. For example, the virtual machine 172 may be terminated and re-activated on a regular or irregular schedule, or the virtual machine 172 may be terminated and re-activated in response to a condition detected by the host operating system 170, or the virtual machine 172 may be terminated and re-activated for another reason.

In some implementations, multiple instances of the virtual machine 172 are running at the same time. An instance of a program is a copy of the program in execution (e.g., a copy of executable code and data structures of the program). For example, one instance of the virtual machine 172 can run one instance of the guest operating system 176 and a second instance of the virtual machine 172 can run a second instance of the guest operating system 176 or of a different guest operating system. When one instance of the virtual machine 172 is terminated, a second instance of the virtual machine 172 can be used to present a second instance of the guest operating system 176 to the user 165. If the second instance of the virtual machine 172 is already active and ready for use then the amount of time needed to switch between instances of the guest operating system 176 is reduced (e.g., reduced relative to a scenario in which the guest operating system 176 is re-installed after an earlier instance of the guest operating system 176 is terminated).

In some examples, programs other than the operating systems may be made available on disk images. For example, the storage device 130 may store application disk images 136 (e.g., a second master image, a third master image, and so on) each of which stores a program that installs an instance of a software application. Here, we use the term software application to include, for example, a program other than an operating system, for example, a program that may provide functions and features to a user 165 of the computer system 100 (e.g., a user 165 who operates the computer system 100 using the input/output peripherals 160).

Examples of a software application program include a web browser, an email program, a word processor, or another kind of program, or any combination of two or more of those. In some examples, the application disk images 136 (sometimes called program packages) may contain installers 137 for software applications 138 that run on the guest operating system 176. For example, when the guest operating system 176 is installed from a disk image 134, software applications can be installed from respective disk images 136 to run on the guest operating system 176. A software application installed on the guest operating system 176, for example, installed on storage that is accessible to the guest operating system 176, can run on the guest operating system 176. Although the guest operating system 176 runs on a virtual machine 172, a program 180 such as a software application runs in the same manner (in particular as far as its user is concerned) as if the guest operating system 176 were running on a physical system such as the computer system 100.

The guest operating system 176 may be re-installed (a process sometimes called refreshing) many times during a single use of the computer system 100. For example, the host operating system 170 may initiate a re-installation of the guest operating system 176. In some implementations, the host operating system 170 can terminate the execution of the guest operating system 176, initiate the re-installation of the guest operating system 176 from the guest operating system disk image 134, and reload the guest operating system 176 for execution. This process of termination, re-installation, and reloading the guest operating system 176 is sometimes called refreshing the guest operating system 176.

Refreshing the guest operating system 176 may have one of several purposes or any combination of two or more of such purposes. In some examples, during the operation of the guest operating system 176, the executable code making up the guest operating system 176 may be altered in a harmful way. We sometimes refer to this kind of harmful modification as affecting the integrity of the operating system. For example, the guest operating system 176 may have been altered by a program 180 in a way that causes the guest operating system 176 to operate in an unexpected manner. The unexpected manner may be harmful, for example, causing the deletion of data stored by the storage device 130, or exposing data stored by the storage device 130 to entities not authorized to access the data (e.g., entities who may access the computer system 100 using the network 144).

The program that does the harmful altering could be a software application used by a user 165, for example, or the program could be a malicious program such as a virus or Trojan horse. Here, we refer to a program or instruction as "malicious" if, for example, the program or instruction causes a harmful action such as the deletion of data, damage to the computer system 100, or exposure of data to unauthorized entities. If the guest operating system 176 has been altered, the alterations are disposed of when the guest operating system 176 is refreshed. The host operating system 170 may generate an instruction to refresh the guest operating system 176 to mitigate any harm caused by unexpected modification to the guest operating system 176. For example, the host operating system 170 may refresh the guest operating system 176 on regular intervals, such as once an hour, once a day, or another interval, or at a random interval, or at some combination of two or more of those. In some implementations, the host operating system 170 may monitor the guest operating system 176 for modifications or failures (e.g., unexpected behavior of the guest operating system 176) and refresh the guest operating system 176 when a modification or failure is detected.

In some implementations, only a portion of the guest operating system 176 is refreshed and a portion of the guest operating system 176 is not refreshed. For example, the host operating system 170 or another system may identify a portion of the guest operating system 176 that has been maliciously altered or otherwise designated to be refreshed. The portion of the guest operating system 176 could be a component of the guest operating system 176 such as the operating system kernel, a device driver, a utility software application, or another component. In some examples, different portions of the guest operating system 176 are scheduled to be refreshed at different times.

In some implementations, any or all of the disk images 132, 134, 136 can be copied to memory 120 before any programs contained in the disk images are executed. For example, the host operating system 170 may copy the guest operating system disk image 134 to memory 120 (for example, copy from the storage device 130). If the host operating system 170 accesses the guest operating system disk image 134 multiple times during a single use of the computer system 100, for example, to re-install the guest operating system 176, the guest operating system disk image 134 will be available in memory 120. In some examples, the speed of access is enhanced when the guest operating system disk image 134 is available in memory 120.

Because the guest operating system 176 operates within a virtual machine 172, a program 180 that runs on the guest operating system 176 generally cannot cause a modification to the host operating system 170, because the virtual machine or the host operating system itself, or both of them, screen the host operating system from such modification. Thus, a refresh of the guest operating system 176 will dispose of any failure or other malicious result caused by a program 180 running on the guest operating system 176 and return the computer system to its normal, intended operating state.

In some implementations, the disk images 132, 134, 135, and 136 are accessible to the host operating system 170 and are not accessible to the guest operating system 176. In this way, if any malicious instructions cause modification of data accessible to the guest operating system 176, none of the disk images 132, 134, 136 will be modified. For example, if the executable code making up the guest operating system 176 is modified then the host operating system 170 can re-install the guest operating system 176 from the guest operating system disk image 134 which remains unmodified.

The host operating system 170 and the disk images 132, 134, 136 could be modified if a program runs on the host operating system 170. For example, a malicious program such as a virus could cause a modification to the host operating system 170 or the disk images 132, 134, 136, or another program such as a program 180 used by the user 165 of the computer system could cause a modification that may be harmful to the integrity of the host operating system 170 or the disk images 132, 134, 136. In some implementations, the host operating system 170 is configured to reduce or minimize any opportunity for any alteration to the host operating system 170, for example, an alteration caused by another program.

In some examples, a program 180 such as a software application contained on one of the disk images 136 may cause a modification that may be harmful to the integrity of the guest operating system 176. The host operating system 170 may detect the modification. For example, the host operating system 176 may regularly compare the state of the guest operating system 176 to a record of its state at a previous time and detect a change. When the guest operating system 176 is refreshed and software applications are re-installed from the disk images 136, the host operating system 170 can opt not to re-install the software application that caused the modification. The host operating system 170 can also opt to delete the disk image 136 containing the software application to avoid future harmful modifications. The host operating system 170 may disable or delete software applications in this way when detecting any malicious activity performed by a software application. The user can be warned that a software application was a source of malicious activity, for example, in a warning message in a user interface.

In some implementations, the host operating system 170 can be configured to be inaccessible to a user 165 of the computer system 100. Typically, the host operating system 170 may include functionality that enables it to present a user interface 162 on the computer system 100 (e.g., on one of the input/output peripherals 160 such as a computer monitor, touchscreen, or other device). When that functionality is in use, the user interface 162 allows a user 165 to interact with the host operating system 170, for example, to install and run software applications on the host operating system 170, or make changes to the configuration of the host operating system 170. To reduce the chances that those activities will compromise the host operating system, the user interface 162 of the host operating system 170 can be disabled so that the user 165 does not have access to the host operating system 170. For example, the host operating system 170 can be modified or configured to not engage in the process of providing a user interface or displaying a user interface 162 when the host operating system 170 runs on a computer system 100.

In some examples, the host operating system 170 is configured to run on the computer system 100 and activate (e.g., load and execute) the virtual machine 172 absent input from the user 165. When the virtual machine 172 is activated, the host operating system 170 activates the guest operating system 176. For example, the host operating system 170 can load the guest operating system 176 into memory 120 and run it on the virtual machine 172. In some examples, the host operating system 170 installs the guest operating system 176 from a disk image 134. When the guest operating system 176 has been activated, the guest operating system 176 engages in the process of providing a user interface and displays a user interface 164 on the computer system 100.

The user 165 of the computer system 100 can then use the user interface 164 of the guest operating system 176 to interact with the computer system 100, for example, run software applications on the computer system 100 (which run on the guest operating system 176). Because the host operating system 170 is not the software that is in charge of providing the user interface and does not display a user interface 162, the user 165 need not interact with the host operating system 170. Further the user 165 may not and need not be aware that the host operating system 170 is running on the computer system 100 or that the host operating system 170 is not the entity that is exposing the user interface to the user.

Because the user 165 does not interact with the host operating system 170, the host operating system 170 can control services (e.g., functionality or features or resources of the hardware) of the computer system 100 independently of any actions of the user 165. For example, the host operating system 170 can enable or disable services of the computer system 100 independently of control of the user 165.

In some examples, the host operating system 170 can enable a network communication device 142 if the computer system 100 is active in a certain geographical or network-accessible area, for example, an office building of a company that owns the computer system 100. If the host operating system 170 detects that the location of the computer system 100 has changed (for example, using a GPS or other location service of the computer system 100), the host operating system 170 can disable the network communication device 142. In this way, the computer system 100 is only usable for network services in a particular geographical area.

In some examples, the host operating system 170 can reduce access of the guest operating system 176 to services of the computer system 100, but those services need not be completely disabled. For example, if the host operating system detects that the location of the computer system 100 has changed, the host operating system 170 may change the configuration of the network communication device 142 so that the network communication device 142 cannot be used to send or receive certain kinds of data, but can be used to send or receive other kinds of data. For example, the host operating system 170 may change the configuration of the network communication device 142 so that data designated as sensitive or secret can only be sent or received in certain geographic areas.

In some examples, the host operating system 170 can enable or disable a portion of the functionality of the network communication device 142. For example, the host operating system 170 can disable functionality of the network communication device 142 for security reasons. The host operating system 170 may be configured to disallow the use of the network communication device 142 for bridging between two networks. In this way, the host operating system 170 would not allow the network communication device 142 to communicate traffic from one network in communication with the network communication device 142 to another network in communication with the network communication device 142. If one network is a local area network (e.g., an internal network of an organization such as a company or government agency), and the other network is a wide area network (e.g., the Internet), traffic on the local area network could not be transmitted to the wide area network. Because a user of the computer system 100 only interacts with the guest operating system 176, the user of the computer system 100 would not be able to circumvent the configuration of the host operating system 170 or the network communication device 142. The network communication device 142 could be configured in other ways for the purpose of enhanced security. For example, the network communication device 142 could be configured to operate as a one-way firewall, such that network traffic from devices on one network could be received by the network communication device 142, but not transmitted to other devices on that network. In some examples, some or all network traffic communicated by the network communication device 142 could be encrypted by the host operating system 170 or the network communication device 142 or both.

In some examples, the host operating system 170 can ensure that a portion of the functionality of the network communication device 142 remains enabled. For example, the network communication device 142 may allow a network service to interact with the host operating system 170, the guest operating system 176, or both. The network service could be a remote management service that allows an entity to access the computer system 100. For example, an administrator of the computer system 100 could access the functionality of the guest operating system 176 from another computer system in communication with the network 144. The host operating system 170 could be configured to allow the administrator access to the guest operating system 176 using the remote management service. Because a user 165 of the computer system 100 does not have access to the host operating system 170, the remote management service cannot be disabled by the user 165. In some implementations, the host operating system 170 may expose services of the computer system 100 to the guest operating system 176. The services could include hardware that can be addressed (read from, written to, or both) by the guest operating system 176 rather than addressed by the virtual machine 172 in response to the guest operating system 176 addressing virtual hardware. For example, the host operating system 170 may enable a program 180 running on the guest operating systems to access services of the computer system 100. The services can be chosen to minimize risk that the program 180 could use the exposed services in a manner that is malicious or otherwise causes a failure of the host operating system 170. For example, the host operating system 170 may expose a service to the guest operating system 176 such as a service that provides data to a program 180 but does not accept data from the program 180 or only accepts data in a limited manner. For example, the host operating system 170 may expose a service such as a video camera in which a program 180 only receives video data from the video camera. In some examples, the host operating system 170 may expose a service such as a network monitoring service that allows a program 180 to receive data about network traffic sent and received by the computer system 100. In some examples, the host operating system 170 may expose a portion of a service to the guest operating system 176 and deny the guest operating system 176 access to other portions of the service. For example, the host operating system 170 may expose a portion of a storage device to the guest operating system 176 such that a program 180 running on the guest operating system 176 can write to one portion of the storage device and not write to another portion of the storage device.

In some implementations, the host operating system 170 may expose a service (e.g., to a program 180 running on the guest operating system 176) in a way that the program can use a device driver of the host operating system 170. For example, if the program 180 is a videoconference program, then the program 180 may use a video camera device driver made available by the host operating system 170. Using this technique, the program 180 could function on a guest operating system 176 that does not support a device driver for the service. Changes to the guest operating system 176 need not affect the functionality of the program 180, for example, changes to the guest operating system 176 that would otherwise affect the ability of the program 180 to interact with a device driver if the device driver were running on the guest operating system 176. A user could upgrade the guest operating system 176 or use a different guest operating system 176 and the service would still be available to the program 180 because the device driver and host operating system 170 remain unchanged.

In some implementations, either or both of the host operating system 170 and the guest operating system 176 are operating systems that can run on multiple configurations of computer hardware, sometimes called general purpose operating systems. Because two operating systems are used, both of the operating systems can be chosen based on separate sets of requirements for features and capabilities.

In some examples, the host operating system 170 may be chosen based on security and reliability requirements. For example, the host operating system 170 could be a Unix-based operating system or a Unix-like operating system such as a Linux operating system or BSD operating system.

In some examples, the guest operating system 176 may be chosen based on user interface requirements or software application availability. For example, the guest operating system 176 could be a Windows operating system or a Mac OS operating system or a *nix operating system (e.g., Unix, Linux, BSD, etc.). In examples in which the user interface 162 of the host operating system 170 is not used, the user interface capabilities of the host operating system 170 need not be considered in the choices or configurations of the host operating system.

Because the guest operating system 176 runs on the virtual machine 172 and the hardware (e.g., the processor 110, memory 120, and other hardware) of the computer system 100 is managed by the host operating system 170, the guest operating system 176 can be chosen independently of the services (such as the hardware) that may or may not be available on any given computer system 100. Any of several guest operating systems could be chosen, for example, depending on preferences of a user.

A large number and variety of different computer systems can host a given guest operating system and related applications as long as the host operating system can be run on all of the different computer systems, and as long as a virtual machine can be hosted by the host operating system on each computer system on which the guest operating system can run. This makes the guest operating system and associated application programs effectively portable from one computer system to another.

Although FIG. 1 illustrates an example in which host operating system 170 and guest operating system 176 execute on a single computer device 100, in other examples computer device 100 may be replaced with a plurality of computer devices. For example, host operating system 170 may execute on a first computer device, and guest operating system may execute on a different second computer device. In such an example, use of virtualized hardware 174 by guest operating system 176 on the second computer device would result in direct operation of hardware included in the first computer device, such as a network communication device, by host operating system 170.

Figure 2:
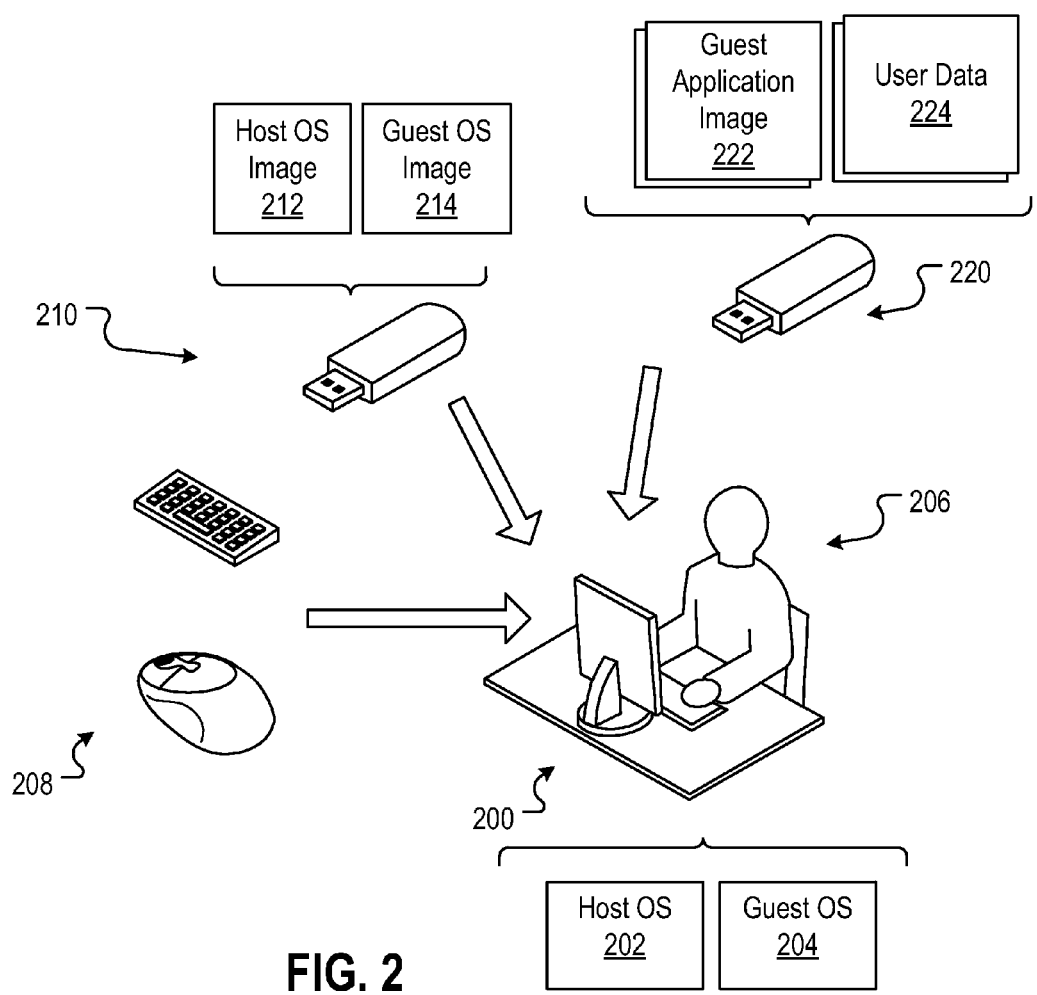
FIG. 2 is a block diagram illustrating delivery and use of the host and guest operating systems via external memory devices.

FIG. 2 is a block diagram of a computer system 200 and storage devices 210, 220. The computer system 200 could be an example of the computer system 100 shown in FIG. 1, and the storage devices 210, 220 could be an example of the storage device 130 shown in FIG. 1. In some implementations, either or both of the storage devices 210, 220 are external storage devices attachable and detachable to and from the computer system 100, also sometimes called removable storage devices. For example, the storage devices 210, 220 could attach to a device interface of the computer system such as a USB (universal serial bus) port or another interface for connecting removable storage devices. In some examples, one or both of the storage devices 210, 220 do not physically attach to the computer system 200. For example, one or both of the storage devices 210, 220 may be accessible by a network such as the network 144 shown in FIG. 1. In some implementations, the first storage device 210 contains a host operating system disk image 212 and a guest operating system disk image 214. The disk images 212, 214 could be examples of the disk images 132, 134 shown in FIG. 1. The host operating system disk image 212 can be used to install a host operating system 202 onto the computer system 200 (or any computer system on which the host operating system can run). The guest operating system disk image 214 can be used to install a guest operating system 204 onto the computer system 200 (or on any computer system on which a host operating system provides a virtual machine on which the guest operating system is capable of running) For example, the guest operating system 204 can run on a virtual machine (e.g., the virtual machine 172 shown in FIG. 1) which runs on the host operating system 202. In some implementations, the host operating system disk image and the guest operating disk image can be stored on different devices.

In some implementations, the first storage device 210 is configured to automatically install the host operating system 202 on the computer system 200. In some implementations, the computer system 100 is configured to identify the disk image 212 and install the host operating system 202 from the first storage device 210. In some examples, the host operating system 202 can be installed into memory 120 or a storage device 130 (FIG. 1) of the computer system. In some implementations, the first storage device 210 contains the executable code of the host operating system 202 in a form that can be used to boot the computer system 200 from the first storage device 210. In this way, the host operating system 202 need not be installed on the computer system 200. In some implementations, the host operating system disk image 212 is used to install the host operating system 202 onto the first storage device 210, which can then be used to boot the computer system 200.

A guest operating system 204 can be installed from the guest operating system disk image 214. For example, the guest operating system 204 can be installed to run on a virtual machine running on the host operating system 202. In some examples, the host operating system 202 causes the guest operating system 204 to be installed, for example, sends a command or triggers a process to install the guest operating system 204.

In some examples of use, a user 206 of the computer system 200 can connect the first storage device 210 to the computer system 200, for example, by plugging a flash memory 210 into a USB port. The host operating system 202 is installed and begins running on the computer system 200 and executes a virtual machine. The guest operating system 204 is installed and then can run on the virtual machine and present a user interface with which the user 206 can interact. From the perspective of the user 206, the computer system 200 appears to be running only the guest operating system 204. For example, if the guest operating system 204 were Microsoft Windows, and the host operating system 202 were Linux, the user would have the perception that the computer system was running on Microsoft Windows, and could be unaware that the host operating system 202 was Linux.

The user 206 can operate the computer system 200 as if only the guest operating system 204 were installed. For example, the user 206 can use hardware resources of the computer system 200, such as input/output peripherals 208, by interacting with the guest operating system 204. Because the host operating system 202 manages interactions with hardware of the computer system 200, the guest operating system 204 need not be configured to manage interactions directly with the computer system 200 or the input/output peripherals 208. A single guest operating system 204 can be used with multiple types of computer systems and multiple types of input/output peripherals and other hardware as long as the computer systems, input/output peripherals, or other hardware are supported by the host operating system 202 and the host operating system 202 runs a virtual machine on which the guest operating system 204 can run. The user 206 could use the first storage device 210 to boot other computer systems besides the computer system 200 shown in FIG. 2. In this sense, the guest operating system 204 becomes easily portable among multiple machines and multiple categories of machines. A guest operating system 204 could run on a different type of machine than it was designed to run on. For example, a guest operating system 204 may have been designed to run on a personal computer such as a desktop or laptop computer, but using the techniques described here, the guest operating system 204 can run on a mobile device such as a smart phone.

In some implementations, the second storage device 220 contains guest application disk images 222 or user data 224 or both. For example, the guest application disk images 222 can be used to install software applications onto the guest operating system 204. The user data 224 can contain data used by software applications, for example, data that the user 206 creates and manipulates. In some implementations, the first storage device 210 is a read-only storage device. For example, data stored on the first storage device 210, such as the operating system disk images 212, 214, may be not alterable (e.g., for security or stability reasons).

Because the user 206 may wish to have access to software applications not included with the guest operating system 204, or because the user 206 may wish to create and alter data while using the computer system 200, the user can use the second storage device 220 as a re-writable storage device alongside a read-only first storage device 210. The user 206 is free to place software applications and user data on the second storage device 220 even though the first storage device 210 does not accept any modifications to its data. The second storage device 220 can then be used to move not only the operating system, but also the user's data and applications from one computer system to another, including computer systems of different kinds.

In some implementations, the computer system 200 accesses the second storage device 220 using a network. For example, the second storage device 220 may be provided by a "cloud computing" service that provides a fixed or variable amount of storage to a user of the computer system 200. "Cloud computing" refers to techniques in which services are provided using a network such as the Internet. The second storage device 220 can be an allocation of storage by the cloud computing service rather than a physical device. In some arrangements, the computer system 200 may have read-only storage that is accessible using a non-network communication technique such as USB and have rewriteable storage accessible using a network communication technique such as a cloud computing service. In these arrangements, the computer system 200 need not have any rewriteable storage accessible using a non-network communication technique, such that all of the rewriteable storage available to the computer system 200 is "cloud computing" storage. For example, a user need not carry or have access to a physical re-writable storage device that can be lost or forgotten, potentially providing safety, simplicity, and flexibility to a user.

Figure 3:
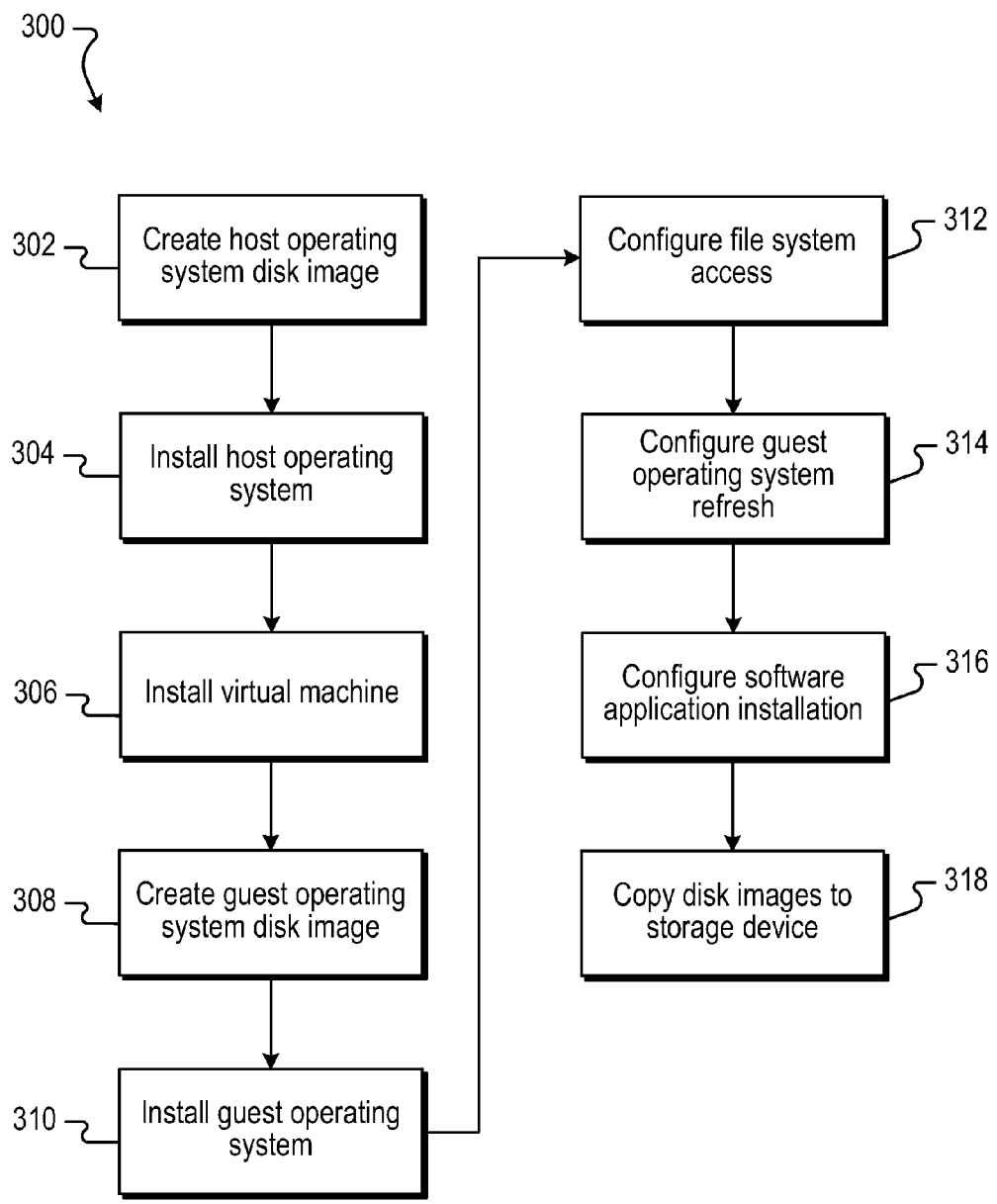
FIGS. 3 and 4 are flow diagrams illustrating the use of application program software in connection with the guest operating system.

FIG. 3 is a flowchart showing an example process 300 for configuring a data storage device (e.g., the storage device 130 shown in FIG. 1 or the storage device 210 shown in FIG. 2) to start up (or "boot") a computer system (e.g., the computer system 100 shown in FIG. 1 or the computer system 200 shown in FIG. 2).

In operation 302, a host operating system disk image is created. For example, the disk image could be the host operating system disk image 132 shown in FIG. 1 or the host operating system disk image 212 shown in FIG. 2.

In operation 304, an operating system (e.g., a host operating system such as the host operating system 170 shown in FIG. 1 or the host operating system 202 shown in FIG. 2) is installed into the host operating system disk image. In some examples, an installation program for the operating system could be executed to generate a configured version of the operating system, sometimes called an installation of the operating system. For example, the operating system could be configured to operate on a particular configuration of computer hardware, such as a particular configuration of a computer system and input/output peripherals. In some implementations, the operating system is configured not to display user interface elements to a user, for example, because a user will interact with a guest operating system and not the operating system serving as the host operating system.

In operation 306, a virtual machine is installed onto the host operating system disk image. The virtual machine can be configured to run on a host operating system, for example, run on the operating system installed on the host operating system disk image. In some implementations, the virtual machine is configured to run whenever the host operating system is active. In some implementations, multiple instances of the virtual machine are configured to run when the host operating system is active. In some implementations, the virtual machine is configured not to display user interface elements (e.g., buttons or toolbars that would otherwise allow a user to disable the guest operating system or the virtual machine). In some implementations, the virtual machine is configured not to accept input specific to the virtual machine. For example, the virtual machine may allow certain keystrokes (or other input made by a user on an input/output peripheral) to activate or deactivate functionality of the virtual machine. The keystrokes or other input combinations specific to the virtual machine can be disabled when the virtual machine is installed.

In operation 308, a guest operating system disk image is created. For example, the disk image could be the guest operating system disk image 134 shown in FIG. 1 or the guest operating system disk image 214 shown in FIG. 2.

In operation 310, an operating system (e.g., a guest operating system such as the guest operating system 176 shown in FIG. 1 or the guest operating system 204 shown in FIG. 2) is installed into the guest operating system disk image. For example, an installation program for the operating system could be executed to generate an installation of the operating system. Because this operating system will be used as a guest operating system, the operating system can be configured to run on the virtual machine installed on the host operating system. In some implementations, the configuration of the operating system to be used as the guest operating system does not include any modifications to the operating system, for example, modifications to the executable code of the operating system.

In operation 312, the host operating system is configured to provide file system access to the guest operating system. In general, one of the functions of an operating system is to provide access by application programs to files organized in a file system in storage. Access to files stored in a file system can enable the program that has access to cause corruption of the files. To reduce the chance of this, in some examples, the guest operating system uses a different file system to read and write data than does the host operating system.

The host operating system can be configured to provide access to files of the file system held in the data storage (e.g., the storage device 130 shown in FIG. 1 or the storage device 220 shown in FIG. 2) in a format useable to the guest operating system. In some examples, the guest operating system uses a network-based file system protocol such as SMB (server message block). The host operating system can be configured to provide access to the guest operating system using the network-based file system protocol. In some implementations, the host operating system can be configured to enable a secondary storage device (e.g., the second storage device 220 shown in FIG. 2) to be accessible using the network-based file system protocol.

In operation 314, the host operating system is configured to refresh the guest operating system. In some implementations, the host operating system can be configured to refresh the guest operating system on a regular schedule or on regular intervals. For example, the host operating system can be configured to use a scheduling program that periodically terminates the guest operating system, re-installs the guest operating system (for example, from a disk image), and starts a new instance of the guest operating system. The host operating system may do this once a day, once an hour, once a week, or at any other interval of time. In some implementations, the guest operating system can refresh at intervals that are not regular or not according to a regular schedule.

In some implementations, the guest operating system can be refreshed based on one or more internal or external triggering events or a combination of them. In some examples, the host operating system is configured to refresh the guest operating system when the host operating system detects a condition present in the guest operating system. In some examples, the condition could be a security condition, for example, the detection of a virus or other malicious program in the guest operating system. In some examples, the condition could be a failure condition, for example, an error in the guest operating system, an infinite loop in the guest operating system, a memory overflow in the operating system, a condition that causes the guest operating system to cease operation (sometimes called a crash or freeze), or another kind of failure condition.

In operation 316, the host operating system is configured to install software applications on the guest operating system. In some implementations, the software applications are stored in disk images, for example, the disk image 136 shown in FIG. 1 or the disk image 222 shown in FIG. 2. For example, the disk images can be stored on a secondary storage device such as the second storage device 220 shown in FIG. 2. In some implementations, software applications are re-installed on the guest operating system each time the guest operating system is refreshed.

In operation 318, the host operating system disk image and the guest operating system disk image are copied to a storage device. In some examples, the storage device could be a removable storage device such as the storage device 210 shown in FIG. 2. In some implementations, the storage device is configured to boot a computer system when the storage device is attached to a computer system. In some examples, the storage device can be configured to copy the host operating system disk image to memory or data storage of a computer system when the computer system powers on. In some examples, the storage device can be configured to allow the execution of the host operating system from the host operating disk image while the disk image remains on the storage device. For example the storage device can be configured to indicate to a computer system that it is a bootable storage device, and the computer system can execute the host operating system from the storage device.

Figure 4:
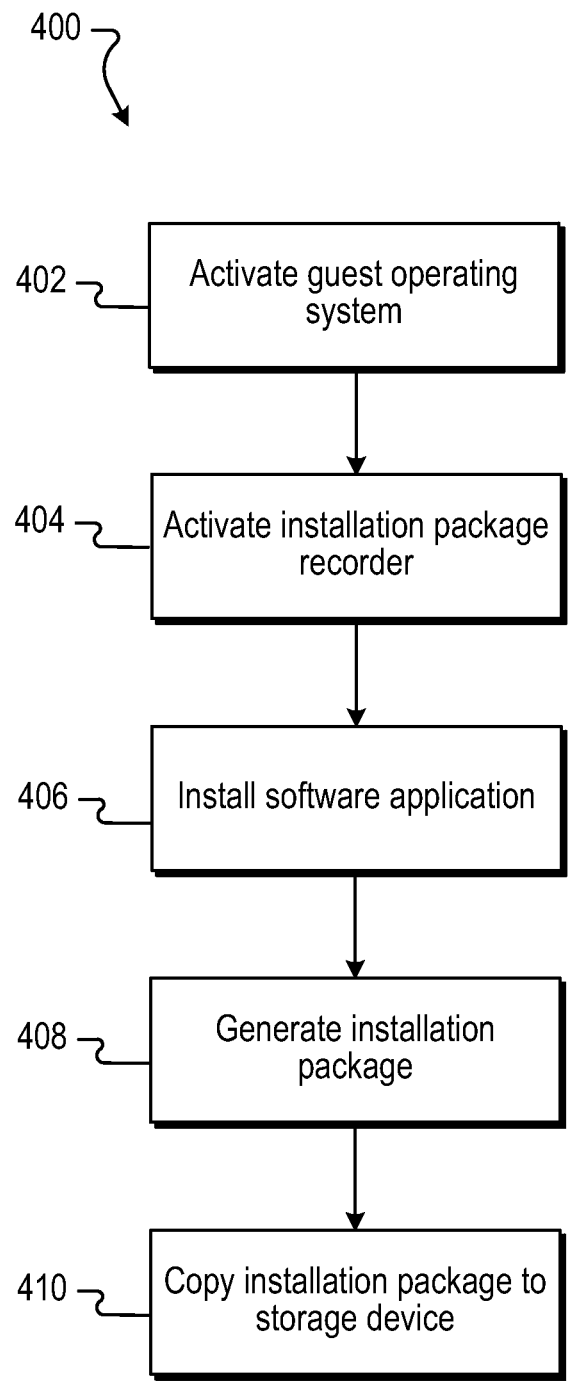

FIG. 4 is a flowchart showing an example process 400 for generating a software application disk image (e.g., the disk image 136 shown in FIG. 1 or the disk image 222 shown in FIG. 2). The disk image can be placed on a data storage device (e.g., the storage device 220 shown in FIG. 2) to be installed on a guest operating system (e.g., the guest operating system 176 shown in FIG. 1 or the guest operating system 204 shown in FIG. 2).

In operation 402, a guest operating system is activated. The guest operating system may run on a virtual machine running on a host operating system. In some examples, the guest operating system is refreshed and then activated so that the guest operating system is running in a known state (e.g., absent any changes made by users or software applications).

In operation 404, an installation package recorder is activated. An installation package recorder tracks changes made to an operating system as a software application is installed. For example, the installation package recorder keeps track of what data is added or altered in the operating system during the installation. The installation package recorder generates an installation package that can repeat the installation of the software application at a later time. For example, the installation package recorder can generate an installation package that contains software that, when executed, installs the software application. In some examples, the installation package is a structured storage file. For example, the installation package could be an MSI file.

In operation 406, the software application is installed. The software application could be an example of the program 180 shown in FIG. 1. The software application can be installed using an installation program that places data and executable code of the software application in storage accessible to the guest operating system and configures the software to run on the guest operating system. In some examples, the software application has user settings, for example, user interface settings, that can be configured. In some examples, the software application has settings for locations at which to store data. For example, the software application can be configured to store data on a particular storage device.

In operation 408, the installation package recorder is deactivated and the installation package is generated. In some examples, the installation package can be placed in a disk image, for example, one of the guest application images 136 shown in FIG. 1 or one of the guest application images 222 shown in FIG. 2.

In operation 410, the installation package is copied to a storage device. For example, the storage device can be the storage device 220 shown in FIG. 2. If the storage device is a rewritable storage device then the storage device may contain other installation packages and other installation packages can be placed on the storage device at a later time.

Figure 5:
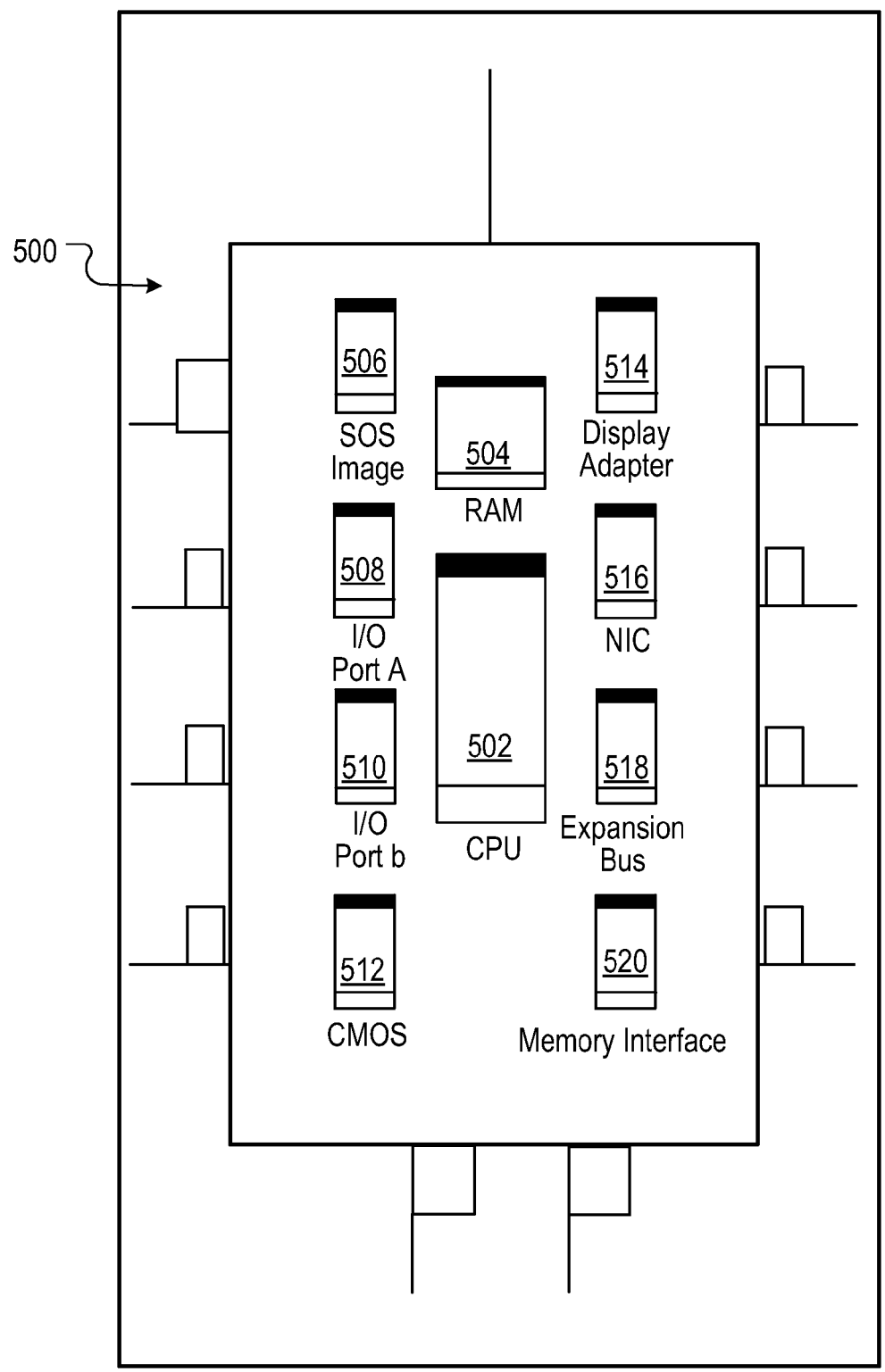
FIG. 5 is a schematic diagram of a "system on a chip" embodiment.

FIG. 5 is a diagram of a microchip 500 containing a computer system and operating systems. For example, the microchip 500 could be an example of the computer system 100 shown in FIG. 1. The microchip 500 has embedded components corresponding to components of other kinds of computer systems. The microchip 500 can include a central processing unit 502, for example, a central processing unit capable of running a general purpose operating system.

The microchip 500 can include memory 504, for example, random access memory that can be addressed by a general purpose operating system. For example, the memory 504 could be an example of the memory 120 shown in FIG. 1.

The microchip 500 can include an operating system image 506. The operating system image 506 can contain an operating system that can run on the microchip 500. For example, the operating system image 506 could be one or more disk images that contain a host operating system 170, a virtual machine 172, and a guest operating system 176, as shown in FIG. 1.

The microchip 500 can include input/output ports 508, 510. For example, the input/output ports 508, 510 can be used to connect input/output peripherals, e.g., input/output peripherals 160 as shown in FIG. 1. The microchip 500 can include input/output firmware 512. For example, the input/output firmware 512 can manage interactions with input/output peripherals (e.g., connected to the input/output ports 508, 510) independently of an operating system. The microchip 500 can include a display adapter 514. For example, the display adapter 514 can connect to a display system such as a computer monitor or television screen or projector or another kind of display system to display user interface elements to a user of the microchip 500.

The microchip 500 can include a network interface 516. The network interface 516 can be an example of the network communication device 142 shown in FIG. 1. The network interface 516 can connect to a network such as a local area network (LAN) or the Internet or both or another kind of network. For example, the network could be the network 144 shown in FIG. 1. In some examples, the network interface 516 is a wired interface that communicates to a network using physically connected wire. In some examples, the network interface 516 is a wireless interface that communicates to a network using wireless signals, for example, using radio frequency (RF) signals. The microchip 500 can include an expansion bus 518. For example, the expansion bus 518 may connect to external peripherals, for example, peripherals that operate on a communication standard such as universal serial bus (USB). The microchip 500 can include a memory card interface 520. The memory card interface 520 can connect to memory cards which can be used as storage, for example, used to store data generated or manipulated by an operating system running on the microchip 500. Because the operating system running on the microchip can be stored on a read-only medium, the microchip does not need hardware such as a large-capacity rewriteable hard disk drive.

The microchip 500 shown in FIG. 5 can provide the same functionality to a user as a general-purpose computer. A general purpose computer may have discrete components, such as a motherboard, hard disk drive, removable media drive, and expansion ports, and may be contained in a housing having a desktop or laptop form factor. The microchip 500 can be housed in a smaller package. For example, the microchip 500 and associated components can be housed in a single integrated circuit package (e.g., a pin grid array package, a land grid array package, a thin small outline package, or another kind of integrated circuit package).

Figure 6:
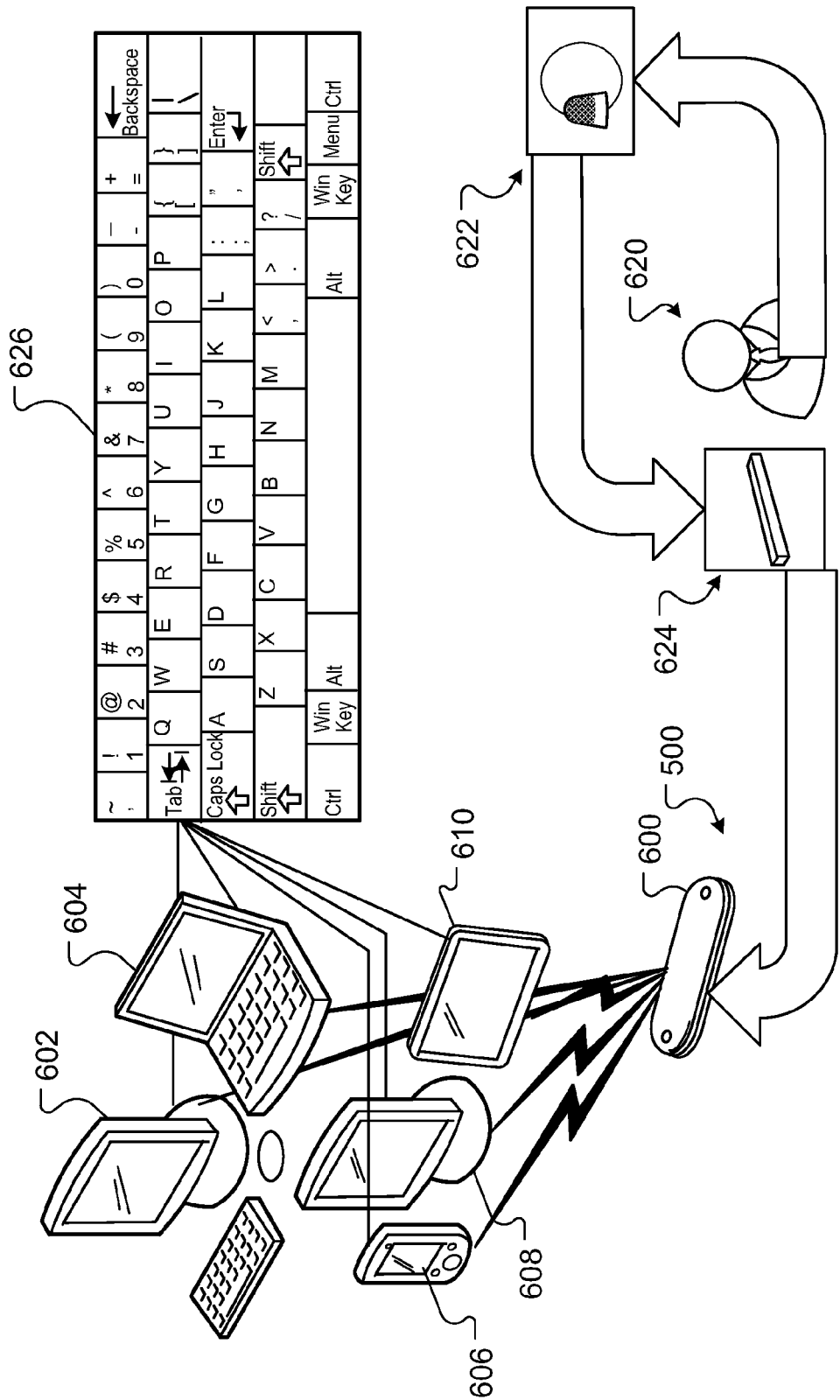
FIG. 6 is an alternate embodiment utilizing a Secure Operating System on a Chip, such as illustrated in FIG. 5.

As shown in FIG. 6, the microchip 500 could be housed in a hand-held device 600. For example, the hand-held device 600 could take the form of a "keychain"-sized device. In some examples, the hand-held device 600 could also have a second function. For example, the hand-held device 600 could be a mobile telephone or a personal digital assistant (PDA) which has functionality other than the functionality described here, including functionality that may not be related to the functionality of the microchip 500. For example, the hand-held device 600 could be capable of making telephone calls. In some examples, the hand-held device 600 could take the form of a digital watch or other personal electronics device.

In some examples, the hand-held device 600 could connect to display systems and input/output peripherals of multiple types. For example, the same hand-held device 600 could connect to a computer monitor, keyboard, and mouse 602, a laptop computer monitor, keyboard, and trackpad 604, a personal digital assistant or smartphone 606, a television 608, a tablet computer 610, or another kind of system having display and input/output peripherals. In some examples, the hand-held device 600 could connect to an existing computer system (e.g., a laptop computer) and interface with the display and input/output peripherals of the existing computer system. Components of the existing computer system, such as the microprocessor and hard drive of the existing computer system, need not be used, although, in some implementations, they might be. In some examples, a variety of display systems or input/output peripherals could be used with the hand-held device 600. For example, the hand-held device 600 could be connected to a sensor bar 624 which allows a user 620 of the hand-held device 600 to use a finger cot 622 to indicate cursor movement or selection on a user interface with his finger, rather than use a pointing device such as a mouse or trackpad. For example, the sensor bar 624 can track the movement of the finger cot 622. In some examples, the hand-held device 600 could use a display device to display a keyboard image 626. The user 620 can use the finger cot 622 to make gestures corresponding to the press of keys on the keyboard image 626. In this way, input/output peripherals such as a keyboard and mouse need not be used (although they could be, of course) with the hand-held device 600, even if the hand-held device 600 runs a general purpose operating system designed to operate with input/output peripherals such as a keyboard and mouse. Because a wide range of peripherals such as displays and input/output peripherals can be used with the hand-held device 600, cheaper peripherals may be chosen than peripherals designed for use for a particular computer system.

In some examples, a device like the microchip 500 shown in FIG. 5 could be integrated with the motherboard of a personal computer. For example, the operating system image 506 could be placed in a read-only storage medium and the read-only storage medium could be permanently integrated with the motherboard. In some examples, a host operating system may run on a central processing unit 502 of the microchip 500 and a guest operating system may run on a central processing unit of the motherboard. A virtual machine may be optional in examples in which the guest operating system runs on a different central processing unit than the host operating system.

The techniques described here could be used in a variety of scenarios. In one example scenario, the microchip 500 shown in FIG. 5 could be integrated with a hand-held device such as a pocket pager. The pocket pager could be an example of the hand-held device 600 shown in FIG. 6. A technician, such as an information technology support technician, who is at home receives a message on the pager requesting the technician's assistance for a technical support matter. The technician can plug his pager into a home television and begin using the television to interface with the operating system running on the pager.

In another example scenario, a user has a hand-held device like the hand-held device 600 shown in FIG. 6. She works on her workstation network during the work day by connecting the hand-held device to a computer monitor and input devices. At the end of the day, she can leave the office and take a train home. When she gets to the train, she connects the hand-held device to her hand-held phone and uses its interface features to turn the phone into a full-fledged general-purpose computer. As another example, the hand-held phone itself may incorporate the microchip 500 shown in FIG. 500 and so the hand-held phone may connect to a computer monitor and input devices during the work day and also be usable as a portable computer.

In another example scenario, a computer system 100 as shown in FIG. 1 has integrated videoconferencing services that function independent of the guest operating system 176 chosen to run on the computer system 100. The videoconferencing services can run on the host operating system 170 and can be available to a user of the computer system 100 regardless of which guest operating system 176 is running and used by the user.

In another example scenario, a computer system 100 as shown in FIG. 1 has integrated screen-sharing services that function independent of the guest operating system 176 chosen to run on the computer system 100. The screen-sharing services can run on the host operating system 170 and allow another user on the network 144 to observe a current view of the guest operating system 176. The other user could be a support technician who is called to remedy a problem with the guest operating system 176.

In another example scenario, a computer system 100 as shown in FIG. 1 could be used in an academic environment. The host operating system 170 can be configured to filter traffic coming through the network communication device 142. For example, inappropriate or non-academic material can be filtered or blocked. A student only has access to the guest operating system 176 and so cannot circumvent the network configuration.

In another example scenario, a computer system 100 as shown in FIG. 1 could be used in a security-sensitive environment such as a government agency. The host operating system 170 can be configured to filter traffic coming through the network communication device 142. For example, data identified as sensitive or secret can be prevented from transmission by the network communication device 142. In some examples, the host operating system 170 may be configured to only receive data over a network 144 and not transmit data over a network. A user or employee only has access to the guest operating system 176 and so cannot circumvent the network configuration.

In another example scenario, the computer system 100 shown in FIG. 1 may be a new addition to a local area network, for example, the local area network of an organization such as a corporation. The computer system 100 can be configured to run the host operating system 170, virtual machine 172, and guest operating system 176 to bolster the security of the computer system 100.

In another example scenario, the computer system 100 shown in FIG. 1 may be configured to transmit and receive network traffic using a proxy server available on the network 144. A proxy server is an entity that receives and retransmits network traffic, for example, to obfuscate the source of network traffic, or to encrypt network traffic. The host operating system 170 can be configured to transmit all network traffic to a chosen proxy server. A user of the computer system 100 only has access to the guest operating system 176 and so cannot circumvent the network configuration.

In another example scenario, the computer system 100 shown in FIG. 1 may be configured to operate on two networks 144 but not simultaneously. One network may be an external network such as the Internet and the other network may be an internal network insulated from communicating with outside networks. The host operating system 170 can be configured to disable access to one network if the other network is in use by the computer system 100. A user of the computer system 100 only has access to the guest operating system 176 and so cannot circumvent the network configuration.

In another example scenario, the computer system 100 shown in FIG. 1 may be configured to operate as a location positioning system device. The computer system 100 can incorporate one or more devices that determine the location of the computer system 100. The devices may include devices that use global positioning system (GPS) techniques or technologies that do not use GPS techniques. For example, the devices may include an accelerometer or another device that measures the relative motion of the computer system 100. The host operating system 170 can be configured to use the devices to calculate the location of the computer system 100. Other types of devices could be used other than location positioning system devices. For example, the devices could measure weather conditions, motion of nearby entities such as automobile traffic, or other types of data. If the computer system took the form of a microchip 500 as shown in FIG. 5, many microchips could be placed at a physical location, for example, a room, a building, an open field, or another location. Each microchip 500 could determine its own location using any of the location techniques described above. The microchips 500 could communicate with each other to provide location data to each other, for example, to improve precision or to verify the location data. In some examples, latency of these communication transfers to multiple devices could be measured as an indication of relative position or determining physical obstacles.

In another example scenario, the microchip 500 shown in FIG. 5 could be integrated with a hand-held device such as a bar code scanner. The bar code scanner could be an example of the hand-held device 600 shown in FIG. 6. The bar code scanner could be used to scan an item having a bar code or other code such as a QR code. Because the bar code scanner has capabilities of a computer system, the bar code scanner can access data about the item through a network and display the data. If the item is a package, the bar code scanner can display shipping information, and if the item is a product, the bar code scanner can display a product manual.

In another example scenario, the computer system 100 shown in FIG. 1 may have a program 180 running on the guest operating system 176 which requires an authorization key to operate. The authorization key may be provided by a manufacturer of the program 180 and ensures that only a purchaser of the program can run the program as a protection against software piracy. The authorization key can be stored by the host operating system 170 in data storage accessible to the host operating system 170 and provided to the guest operating system 176 when the program 180 is running Under this arrangement, a user cannot access the authorization key to copy or modify the authorization key. For example, the user is not able to copy the authorization key to another computer system to run the program 180 without authorization.

In another example scenario, software piracy may be prevented by including software within host or guest operating systems which are placed within a miniature computer system or read only device. This would make unauthorized copy very difficult to perform because software would be embedded within the computer system, and it would be cheaper to buy an authorized copy rather than to attempt unauthorized copying by replicating another comparable hardware device. Such protection could be increased by encryption and hashing algorithms.

In another example scenario, the computer system 100 shown in FIG. 1 could be configured to interface with a data storage system, for example, a data storage system accessible using one of the input/output devices 140 or using the network communication device 142. If the data storage system contains data deemed sensitive, the host operating system 170 running on the computer system 100 can be configured to disable all operations in which data is written to writeable storage (e.g., the storage device 130). Thus, data cannot be copied from the data storage system to another data storage device by a user 165 of the computer system 100. Because the user 165 does not have access to the host operating system 170, the user 165 is not able to circumvent the configuration of the host operating system 170 to allow data to be copied. This would allow computer system to connect to both internal and external networks/storage and allowing to transfer sensitive data from internal network/storage to external network/storage. This functionality could be enhanced by placing document discovery agents as part of the computer system which would discover files on local storage of the computer system (including virtual storage residing in memory, e-mail, file archives, system configurations/customizations, etc.), classifying them and depositing them in an internal central electronic discovery system. This would provide document protection from unauthorized use/distribution as well accidental deletion before data is preserved/backed-up. These agents could download files from a central repository upon reconnection transparently to the user. This would add redundancy to computer system without requiring other local redundant hardware/software.

In another example scenario, unauthorized replication of a computer system may be prevented by including a hashing identification within a permanent read-only memory within a computer system circuit, such as a single-chip system. Consequently, even when the chip is physically copied, it would not be functional because the hashing identification would not match. It is possible to enhance this technique by embedding an identification creation time stamp which would make a copied ID different from original. Also, instead of this time stamp another environmental parameter could be used which would make successful replication of the identification very difficult.

In another example scenario, one may ensure that a computer system could not get a virus that would permanently damage the data stored on the computer system by not allowing a user or the guest operating system to modify an image for the guest operating system which is stored within a host operating system inaccessible to the user. The computer system may be configured to require scanning and virus removal at computer system start-up or prior to guest operating system start-up. The host operating system could force running/updating virus protection software to prevent run-time viruses.

In another example scenario, a computer system may extend hardware support for newly created hardware/firmware updates without modification of a guest operating system by the host operating system presenting to the guest operating system a virtual peripheral or device and having the host operating system update itself via data sent and received by the network services, which would be seamless from the point of view of the guest operating system. This would extend the guest operating system in regards security and device support without requiring modification to, or in many cases interruption of, the guest operating system.

In another example scenario, there is a redundant computer system with no single point of failure by creating a circuit with two cores, where the second core would share access to system memory for memory replication. This would allow for greater performance and cost reduction in manufacturing of such systems than current redundant system designs which include separate redundant hardware components, redundant controller to coordinate fail-over, or large size copper traces, etc. This is possible because an operating system image is static and a need for intermediate components for data transfer (bus) between processor to physical memory and to auxiliary I/O subsystems would be reduced since host and guest operating systems could reside within a central processing unit and use of auxiliary I/O subsystems is not required for core guest operating system functions.

In another example scenario, one may persist an active memory state of a primary processing unit without impact to performance of the primary processing unit (core) by the redundant dual core computer system design described above where the secondary core has access to writable memory store (those writes could be cached via bus since data transfer to such writable memory would be slower than inter-process communications). This is possible because an operating system image is static and a need for intermediate components for data transfer (bus) between processor to physical memory and to auxiliary I/O subsystems would be reduced since host and guest operating systems could reside within central processing unit and use of auxiliary I/O subsystems is not required for core guest operating system functions.

In another example scenario, multiple running instances of a guest operating system are maintained. In the event that a currently active instance fails as a result of an error condition such as a bug or virus, the system can seamlessly transfer over to a different running instance, relying on the above-described logical separation of the guest operating system and user data to quickly transfer user state to the new instance.

In another example scenario, a live upgrade of a guest operating system may be performed in a manner not disruptive to user, by running simultaneous versions of a guest operating system and relying on the above-described logical separation of the guest operating system and user data to quickly transfer user state to an instance with a different version of the guest operating system and switch over to the instance.

In another example scenario, multiple instances of different types and/or versions of a guest operating system may be maintained. These instances may interoperate by way of grid software agents installed in each instance.

In another example scenario, a bridge may be created between various communication/application protocols via running multiple instances of guest operating systems that respectively support various protocols and inter-operate among themselves via common protocols. Examples include creating routing/interoperability among network protocols such as NetBIOS, TCP/IP and SNA, IP4, IP6, mail protocols, tunneling, EDI, network enabling inter-process communications such as DDE, etc. This technology could be used in creating next generation network switches.

In another example scenario, inter-process communication (IPC) protocols may be accelerated by creating a bridge between various protocols. For example, some protocols such as DDE are extremely efficient in IPC creation while other protocols are more efficient in routing and load management. Use of a single protocol could result in a bottleneck in an area of protocol weakness, but conversion within a single operating system would lead to some performance degradation. In contrast, the integration of multiple guest operating systems which manage various protocols and/or distributing a work load among multiple processing cores can eliminate those bottlenecks.

In another example scenario, content generation/search using native protocols for various content may be performed by distributing the generation/search among multiple guest operating systems that are native protocol capable.

In another example scenario, additional software functionality may be added to an operating system via converting the operating system into a host operating system and importing the additional software functionality by including a guest operating system which already has the desired functionality or has tools/development resources to generate such software. This capability could be extended via conversion software which could analyze the functionality of imported software components and convert them to a format native to the host operating system or another common format.

In another example scenario, a customer may choose a guest operating system and software installed on it by an automated computer manufacturing system or updates to a PROM of a newly created computer system.

In another example scenario, software may be installed in a guest operating system by physically attaching software cartridges/files without any modification to a core guest operating system and the software de-installed by uninstalling software cartridges/removing files.

In another example scenario, the above host and guest operating systems may be instantiated without use of a hypervisor. A general principle of at least some of the designs described in this disclosure is a decoupling of the host and guest operating systems and a separation of their roles. For example, where the host operating system provides hardware resources, generic services, maintains policies, and enforces quality of service (QoS) of the overall system; and where the guest operating system maintains user interactions and state while separating into discrete structures the guest operating system itself, application/configuration groups (ACG) installed on the guest operating system, and user data.

Thus, a data structure that contains the host operating system may be static across various host/guest pairs. Also, a data structure for the guest operating system may be common across various host/guest pairs. Application/configuration groups may not be common across each of the host/guest pairs, but are repeatable. User data is generally unique to a host/guest pair, but generally is relatively small in size and highly compressible. Therefore, it is possible to reconstruct host/guest pair instances located anywhere geographically (physically or logically) from these data structures. In some examples, an Overall Management Layer (OML) may be provided which performs authentication, user data retrieval, and construction of host/guest pairs using grid and cloud services. In such examples it is not required that respective computer devices for the host operating system and guest operating system for a host/guest pair be located in physical proximity. For example, an instance of the guest operating system may reside inside a minimal operating environment, such as a minimal host from a features and resource prospective that could be designated a "virtual BIOS," in proximity to a user and resource requests would be sent to the above-mentioned grid or cloud to assign a host computer device for host roles in a host/guest pair during run-time operations. Communications between the guest and host operating systems could be carried out via an Application Programming Interface (API) embedded into virtual drivers included with a guest operating system instance or APIs within the OML.

In another example scenario, the host operating system may perform scanning of guest operating system application components and initiate or perform removal of a defective/infected application or application components. Alternatively, removal could be substituted by a quarantine procedure in which components are moved to an alternate location where they would not be utilized by the guest operating system and could be repaired and/or analyzed at a later time. A general principle of at least some of the designs described in this disclosure is a decoupling of the host and guest operating systems and a separation of their roles. For example, the host operating system provides hardware resources, generic services, maintains policies, and enforces quality of service (QoS) of the overall system, and the guest operating system maintains user interactions and state while separating into discrete structures the guest operating system itself, application/configuration groups (ACG) installed on the guest operating system, and user data. If a defect or virus is introduced or identified, often it may be located within a specific ACG or user data. Therefore, it may be possible to automatically eliminate such defects or viruses by scanning of ACG or user data by the host operating system, such as before the guest operating system is instantiated. This scanning time could be significantly reduced by the knowledge that a specific ACG or user data fragment was already scanned last time. In one example, verification of no changes could be done using MD5 signatures or other data hashing techniques. If ACG or user data fragment is determined to be defective, it could be removed or quarantined. In this manner, defective data may be automatically prevented from remaining or injecting itself into the user run-time environment provided by the guest operating system.

In another example scenario, password management may be delegated from the guest operating system to the host operating system. A number of common security risks arise out of user passwords, such as a user using a single password or similar passwords across in multiple applications (specifically web applications), the use of simple or common passwords vulnerable to dictionary attacks, and storing stronger passwords in files where they could be accessed by a hostile party and decrypted. However, the above-described techniques enable decoupling of the host and guest operating systems, such that they do not have direct access to each other's run-time data unless such data is explicitly shared. Thus, by storing passwords within the host operating system, processes running within the guest operating system are unable to access such passwords. A service or services may be configured within the host operating system to identify and remove stored copies of passwords within the guest operating system, detect by analysis of HTTP traffic when passwords are utilized (such as account creation, account login, and password modification), and ensure that strong passwords (e.g., randomly generated passwords unique to respective applications) generated and managed by the host operating system are utilized and preferentially sent via a secure channel, such as HTTPS. Because this is performed automatically and transparently by the host operating system, a user of the guest operating system is not exposed to and may not access the actual strong password utilized for particular applications. This would prevent "social engineering" attacks commonly used to retrieve user-managed passwords. Additionally, this could enhance the user experience by eliminating the need for a user to remember passwords. Unique passwords may be assigned per each target application/user combination. The host operating system could also ensure that a HTTP request including a password is actually sent to its proper destination IP and is not just "high-jacked" by a hostile party.

Although example computer systems have been described in relation with the above figures, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Although the systems described here are described in the context of two separate operating systems, a host and a guest, each having its own framework and functionality, the techniques described here are not limited to such a bifurcated structure. In some implementations, both of the operating systems are wrapped within a single computer program having two sectors that cooperate with each other as if they were independent systems, with the sector that directly interfaces with user being periodically refreshed under the control of the second sector that interfaces solely with the hardware and communication layers of the computer system.

For example, some operating systems are designed so as to divide operations between kernel space and user space. Kernel space program code manages computing resources used by applications in user space. Example functions for kernel space program code include, but are not limited to, processor management, memory management, and device management. A kernel abstraction layer may be provided for isolation required to protect host operating system resources from being damaged by a guest operating system user space process, such as a virtual machine program. In turn, the guest operating system divides operations between kernel and user space and provides for isolation of user space processes executing within the guest operating system. A virtualization layer between the guest operating system and the host operating system may provide an additional layer of isolation in the event that the guest operating system is insecure and allows user space processes to directly or indirectly tamper with kernel space objects.

In some implementations, the techniques described in this application are implemented by using fully functional operating systems, such as commercially available "off the shelf" operating systems, and a virtualization layer between the operating systems. However, in other implementations, instead of a fully functional operating system, components similar to an operating system and a virtualization layer may be used to achieve such isolation, although other features typically present in a fully functional operating may be missing.

Other implementations are within the scope of the following claims.

The invention claimed is:

1. A system comprising:
a computer system comprising:
   a network communication device;
   a host operating system executing on the computer system, the host operating system being configured to directly operate the network communication device;
   a virtualized network communication device, wherein use of the virtualized network communication device results in direct operation of the network communication device by the host operating system;
   a guest operating system executing on the computer system as though it were issuing instructions to a simulated processor of simulated hardware of said virtualized network communication device, the guest operating system being configured to use the virtualized network communication device for network communication activities and running on the simulated processor and the virtual machine;
   a first nonvolatile data storage device storing a master image of the guest operating system; and
   a second nonvolatile data storage device storing user information generated by the guest operating system;
wherein said virtual network communication device arranges for the instructions to be actually carried out by the computer system, and the virtual machine shields the host operating system of the computer system;
wherein, in response to the instructions generated by the host operating system, the computer system is configured to automatically refresh the guest operating system from the master image stored in the first nonvolatile data storage device and the user information stored in the second nonvolatile data storage device; and
wherein if the guest operating system is exposed to a condition that could cause an ongoing failure, the guest operating system is refreshed by the host operating system by reloading and re-executing all or part of the operating system from an unchanging master image, then any modification causing an ongoing failure are eliminated and therefore need not be permanent.

2. The system of claim 1, further comprising:
a virtual machine which includes the virtualized network communication device, the guest operating system executing within the virtual machine.

3. The system of claim 2, wherein
the virtual machine executes within the host operating system.

4. The system of claim 1, further comprising:
a display device configured to display images;
an input device configured to receive instructions from a user;
a virtualized display device, wherein use of the virtualized display device results in operation of the display device by the host operating system; and
a virtualized input device, wherein input received by the host operating system via the input device is provided to an operating system using the virtualized input device;
the guest operating system being configured to use the virtualized display device to display a user interface and configured to use the virtualized input device to provide input for operating the user interface.

5. The system of claim 4, wherein
the host operating system does not provide a user interface at the display device.

6. The system of claim 1, further comprising:
a virtualized data storage device, wherein use of the virtualized data storage device results in direct operation of the second nonvolatile data storage device by the host operating system, and the guest operating system being configured to use the virtualized data storage device for data storage activities.

7. The system of claim 1, wherein
in response to an instruction from the host operating system, the computer system is configured to install an application program on the guest operating system.

8. The system of claim 7, wherein
the host operating system is configured to identify and record a problem associated with the application program, and
in response to the instruction from the host operating system, the computer system is configured to install the application program on the guest operating system unless the host operating system has recorded a problem associated with the application program.

9. The system of claim 8, wherein
the host operating system is configured to generate the instruction in response to identifying a problem associated with the application program.

10. The system of claim 1, wherein
the computer system is configured to monitor operation of the guest operating system; and
the host operating system is configured to generate the instruction in connection with the monitoring of the guest operating system.

11. The system of claim 10, wherein
the host operating system is configured to generate the instruction in response to a detected condition of the guest operating system.

12. The system of claim 10, wherein
the host operating system is configured to generate the instruction in response to a detection of unauthorized access of the guest operating system.

13. The system of claim 1, wherein
the host operating system is configured to periodically generate the instruction.

14. The system of claim 1, wherein
the master image is unchanged from refreshing to refreshing of the guest operating system.

15. The system of claim 1, wherein
the host operating system is configured to encrypt communication made using the network communication device in response to use of the virtualized network communication device by the guest operating system.

16. The system of claim 1, wherein
the host operating system is configured to perform monitoring and control of network communications requested by the guest operating system.

17. The system of claim 1, wherein
the host operating system is configured to perform automatic maintenance of device drivers without requiring user interaction and without requiring termination of the guest operating system.

* * * * *